(12) United States Patent
Moebius et al.

(10) Patent No.: US 10,908,372 B2
(45) Date of Patent: Feb. 2, 2021

(54) SYSTEMS AND METHODS FOR ISOLATING EXCITATION AND SIGNAL PATHS FOR CHIP-SCALE LIDAR

(71) Applicant: The Charles Stark Draper Laboratory, Inc., Cambridge, MA (US)

(72) Inventors: Michael G. Moebius, Somerville, MA (US); Steven J. Spector, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/912,196

(22) Filed: Mar. 5, 2018

(65) Prior Publication Data

US 2019/0271821 A1    Sep. 5, 2019

(51) Int. Cl.
*G02B 6/26* (2006.01)
*G02B 6/42* (2006.01)
(Continued)

(52) U.S. Cl.
CPC .............. *G02B 6/43* (2013.01); *G01S 17/04* (2020.01); *G02B 6/12007* (2013.01);
(Continued)

(58) Field of Classification Search
CPC .... G02B 6/43; G02B 6/3552; G02B 26/0875; G02B 6/12007; G02B 27/0087; G01S 17/026
(Continued)

(56) References Cited

U.S. PATENT DOCUMENTS

| | | |
|---|---|---|
| 4,013,000 A | 3/1977 | Kogelnik |
| 2002/0048423 A1 | 4/2002 | Frick et al. |

(Continued)

FOREIGN PATENT DOCUMENTS

| | | |
|---|---|---|
| WO | WO 2003/098263 A2 | 11/2003 |
| WO | WO 2003/098263 A3 | 11/2003 |

(Continued)

OTHER PUBLICATIONS

Vivien, L., et al., "Experimental Demonstration of a Low-Loss Optical H-Tree Distribution Using Silicon-on-Insulator Microwaveguides," *Applied Physics Letters*, vol. 85, No. 5, pp. 701-703, Aug. 2, 2004.

(Continued)

*Primary Examiner* — Kaveh C Kianni
*Assistant Examiner* — Hung Q Lam
(74) *Attorney, Agent, or Firm* — Sunstein LLP

(57) ABSTRACT

Embodiments described herein improve the performance of active sensing systems, such as LiDAR systems, and enable detection of objects closer to the system's sensor. Illustrative embodiments enable spatial separation of the excitation and return signal on a photonic integrated chip ("PIC") such that separate waveguides can be used for the excitation and return signals, enabling isolation of the system's detectors from the excitation source without the use of a splitter or circulator. For example, preferred embodiments avoid loss due to the use of splitters and the need for gating the detector, and are desirably compatible with chip-scale systems. Moreover, illustrative embodiments enable keeping the excitation and detection paths on the same PIC (e.g. in an interleaved configuration), which helps keep the system more compact and avoid issues introduced by parallax.

12 Claims, 18 Drawing Sheets

(51) Int. Cl.
*G02B 6/32* (2006.01)
*G02B 6/34* (2006.01)
*G02B 6/43* (2006.01)
*G02B 26/08* (2006.01)
*G02B 6/12* (2006.01)
*G02B 6/35* (2006.01)
*G01S 17/04* (2020.01)
*G02B 27/00* (2006.01)

(52) U.S. Cl.
CPC ....... *G02B 6/3552* (2013.01); *G02B 26/0875* (2013.01); *G02B 27/0087* (2013.01)

(58) Field of Classification Search
USPC .......................................................... 385/15
See application file for complete search history.

(56) References Cited

U.S. PATENT DOCUMENTS

| 2013/0027715 | A1 | 1/2013 | Imaki et al. | |
|---|---|---|---|---|
| 2018/0175961 | A1* | 6/2018 | Spector | G02B 6/3526 |
| 2019/0018113 | A1* | 1/2019 | Sayyah | G01S 7/4817 |
| 2019/0179064 | A1* | 6/2019 | Zhang | H04B 15/00 |

FOREIGN PATENT DOCUMENTS

| WO | WO 2008/045126 A2 | 4/2008 |
|---|---|---|
| WO | WO 2008/045126 A3 | 4/2008 |

OTHER PUBLICATIONS

Chun W., et al., "Spatial 3-D Infrastructure: Display-Independent Software Framework, High-Speed Rendering Electronics, and Several New Displays," appeared in *Stereoscopic Displays and Virtual Reality Systems XII*, Proceedings of SPIE-IS&T Electronic Imaging, SPIE vol. 5664, pp. 302-312 (2005).

Geng, J., "Three-dimensional display technologies," *Advances in Optics and Photonics*, vol. 5, pp. 456-535 (2013).

Halle, M.W., "Holographic stereograms as discrete imaging systems," *SPIE Proceeding #2176* "Practical Holography VIII", 12 pages (Feb. 1994).

Holliman, N.S., et al., "Three-Dimensional Displays: A Review and Applications Analysis," *IEEE Transactions on Broadcasting*, vol. 57, No. 2, pp. 362-371 (Jun. 2011).

Seok, T.J., et al., "Large-scale broadband digital silicon photonic switches with vertical adiabatic couplers," *Optica*, vol. 3, No. 1, pp. 64-70 (Jan. 2016).

Smithwick, Q.Y.J., et al., "Interactive Holographic Stereograms with Accommodation Cues," *Practical Holography XXIV: Materials and Applications*, SPIE, 14 pages (2010).

* cited by examiner

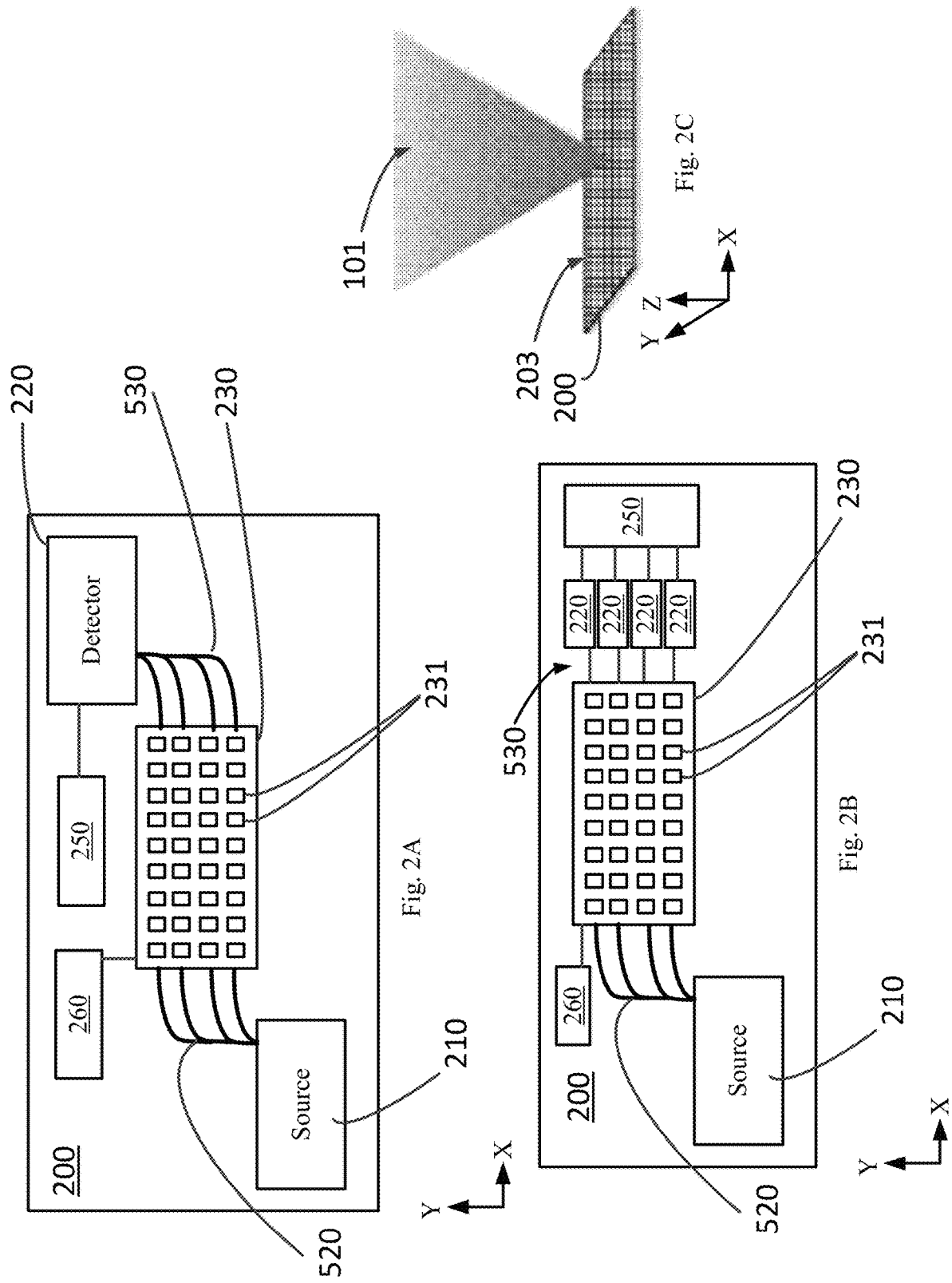

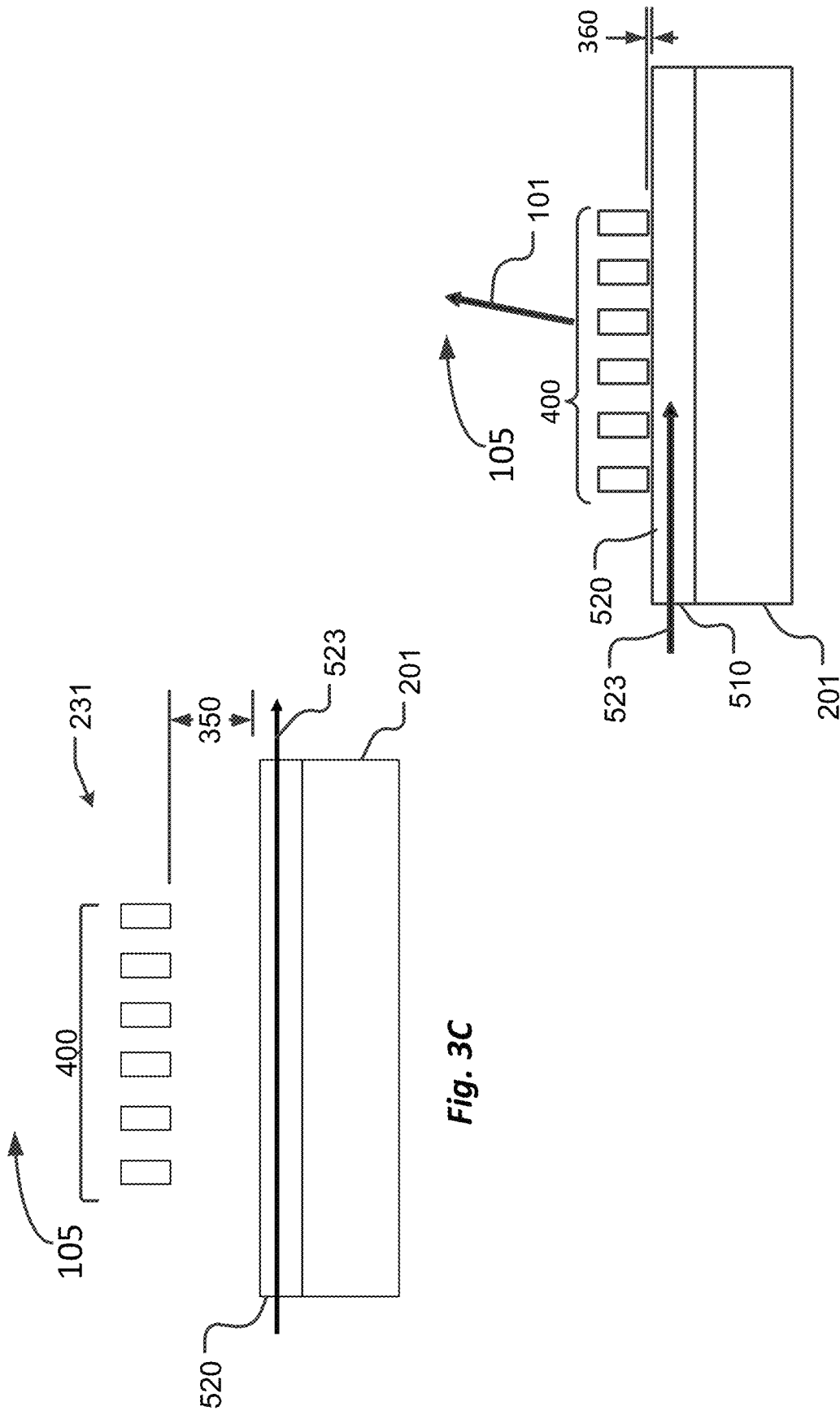

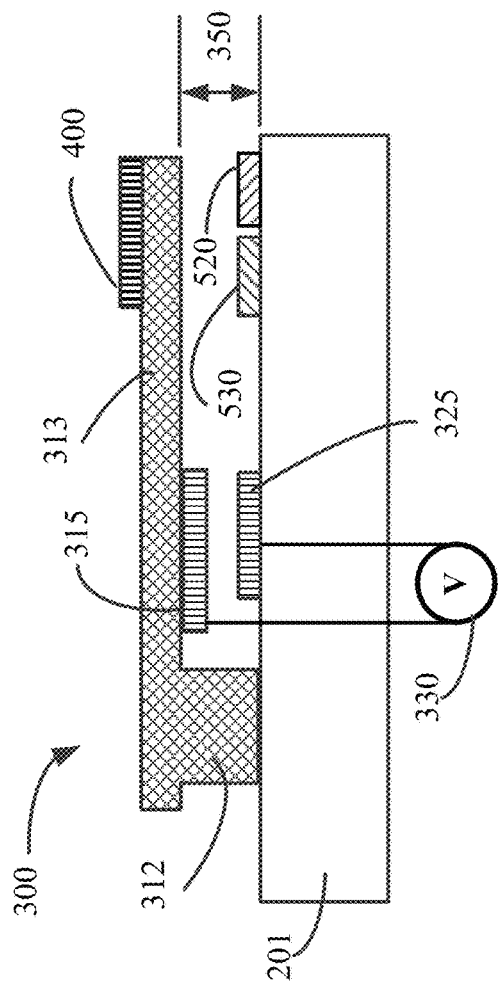
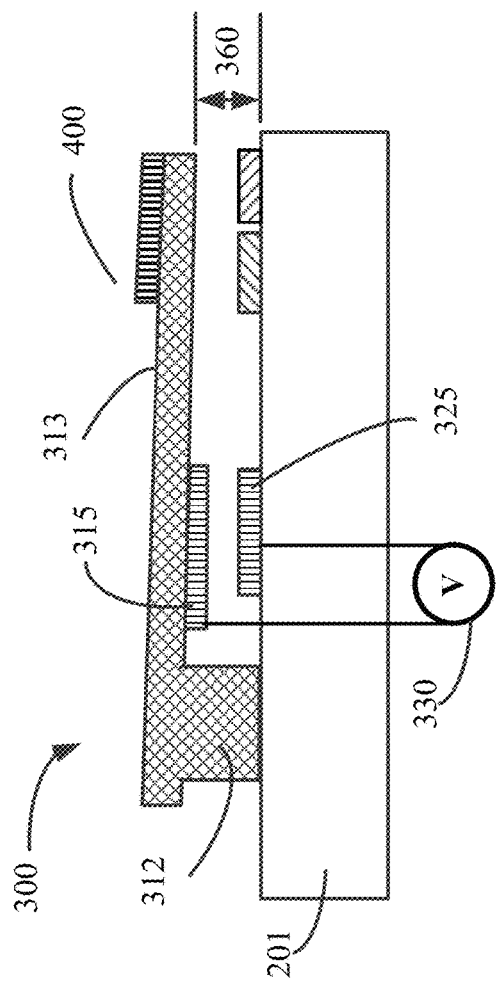

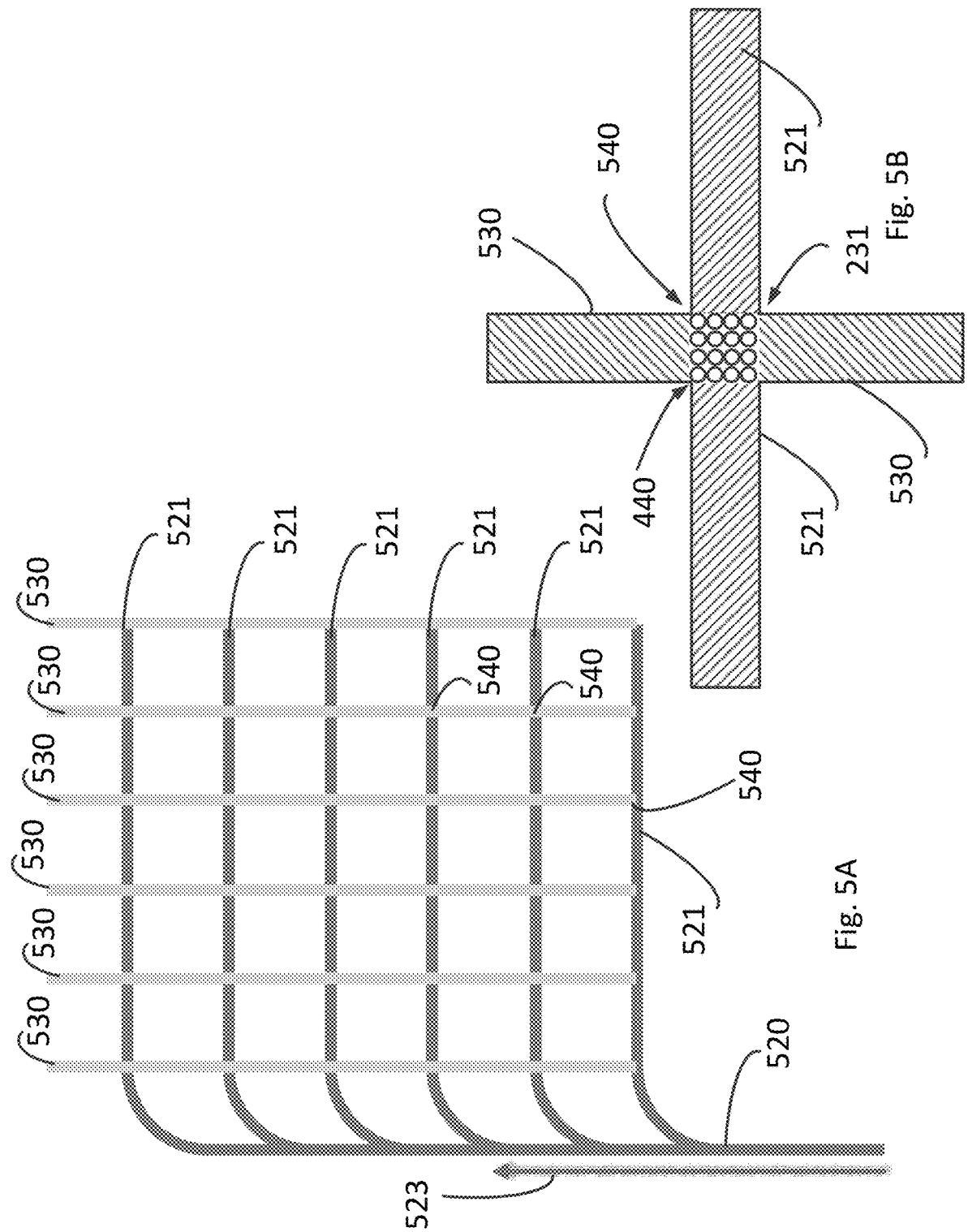

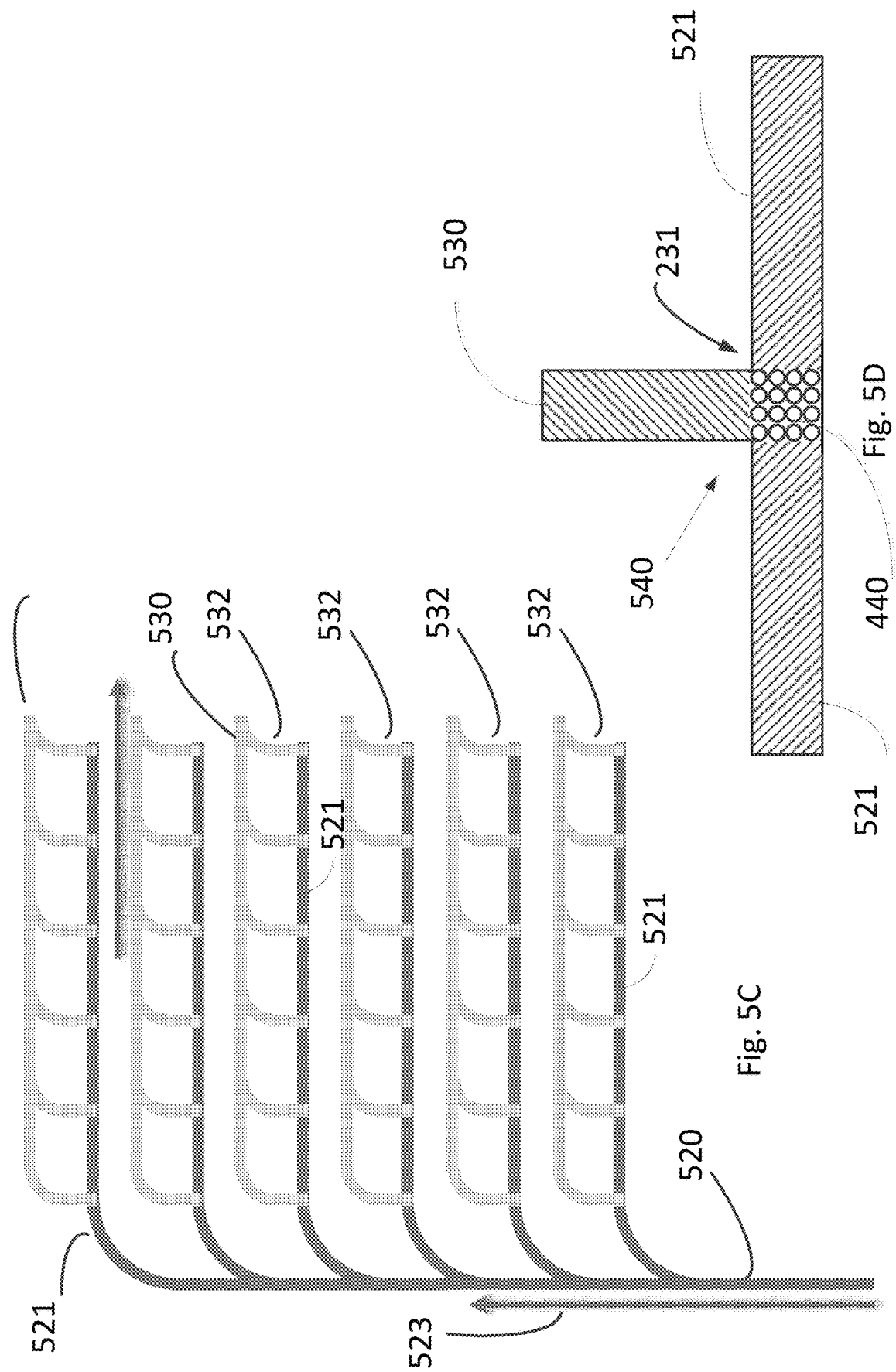

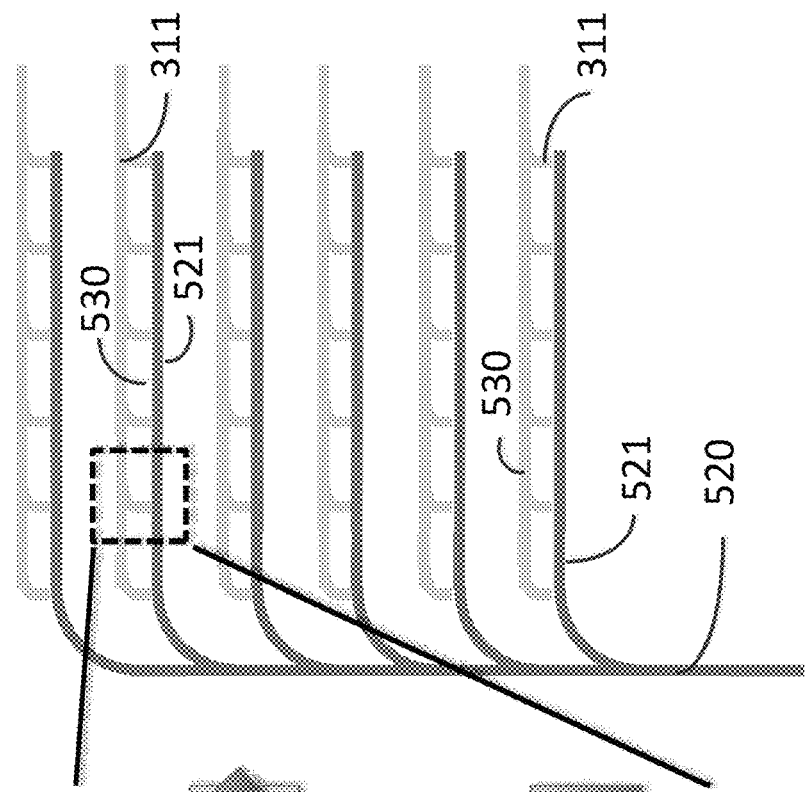
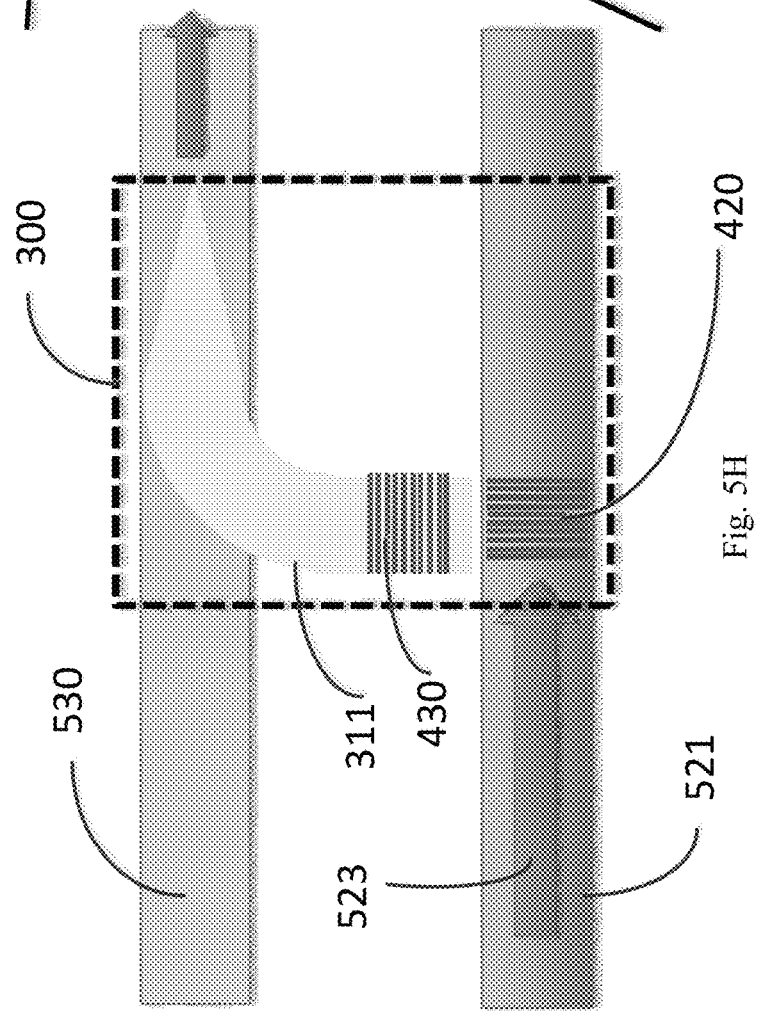
Fig. 5G
Fig. 5H

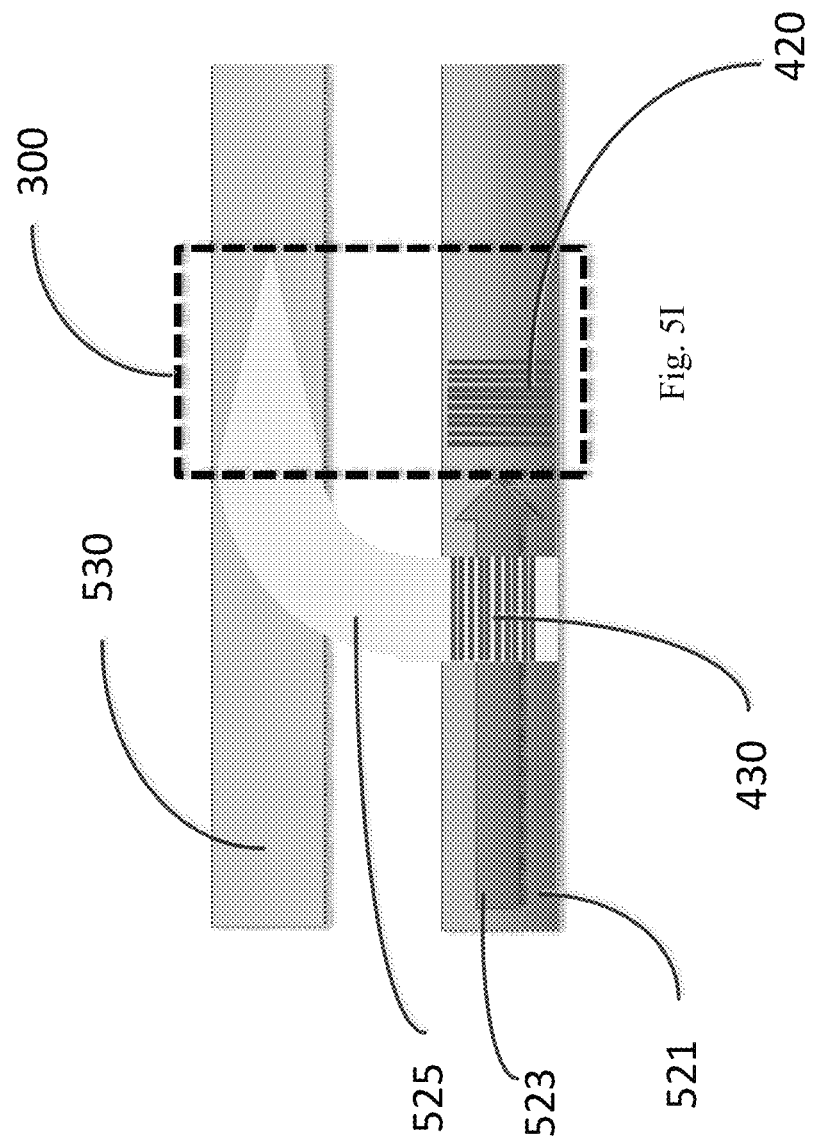

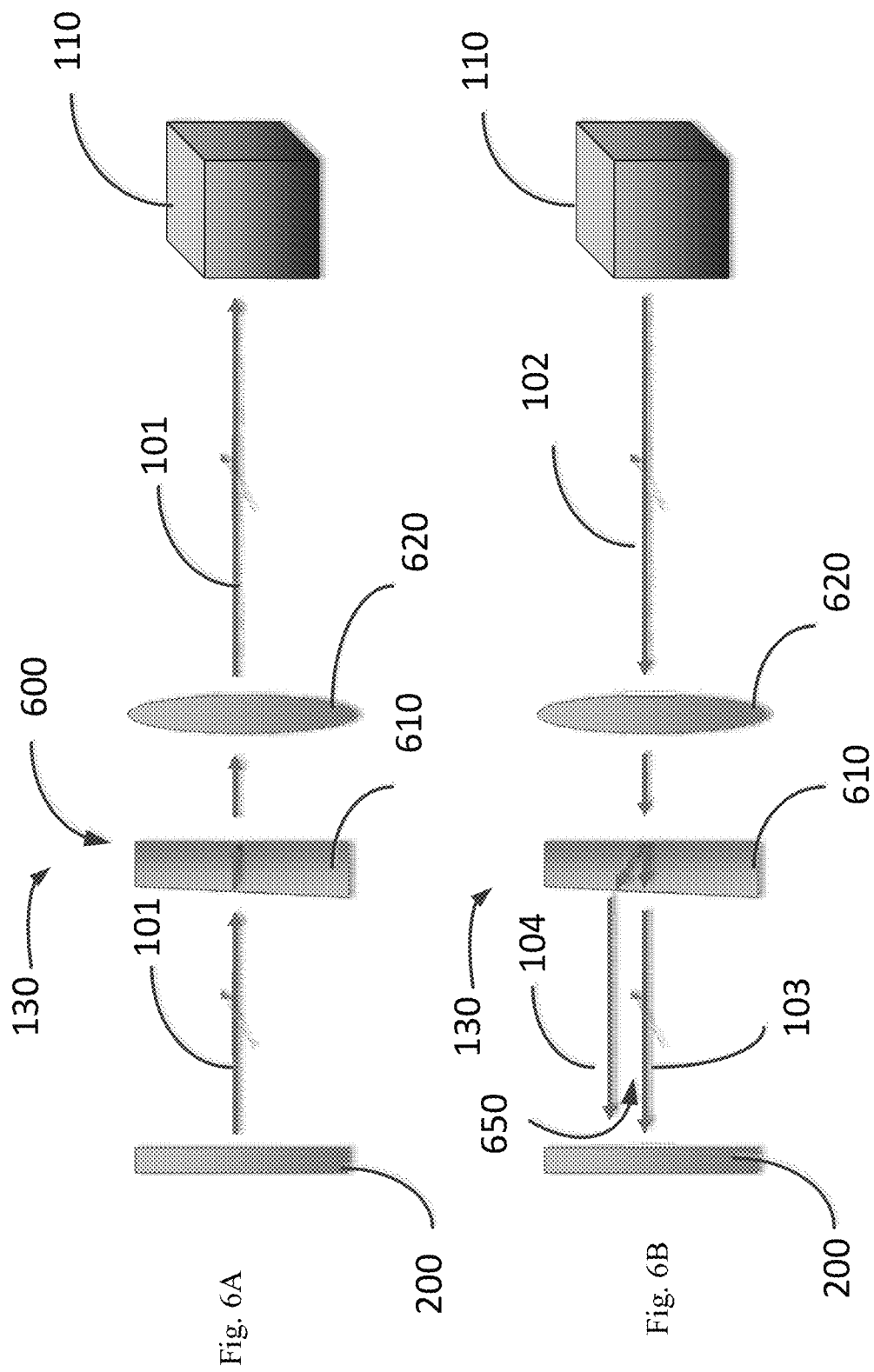

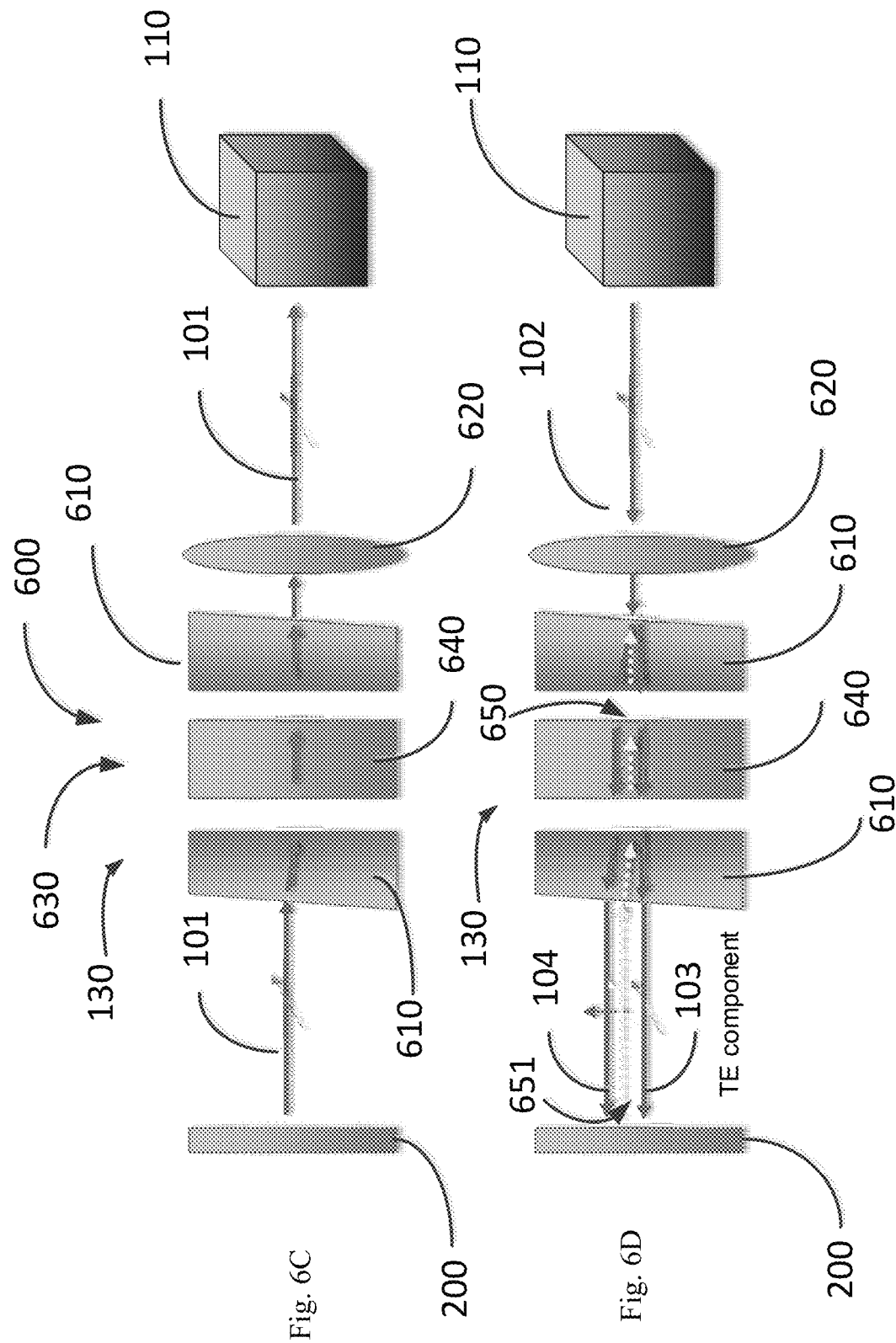

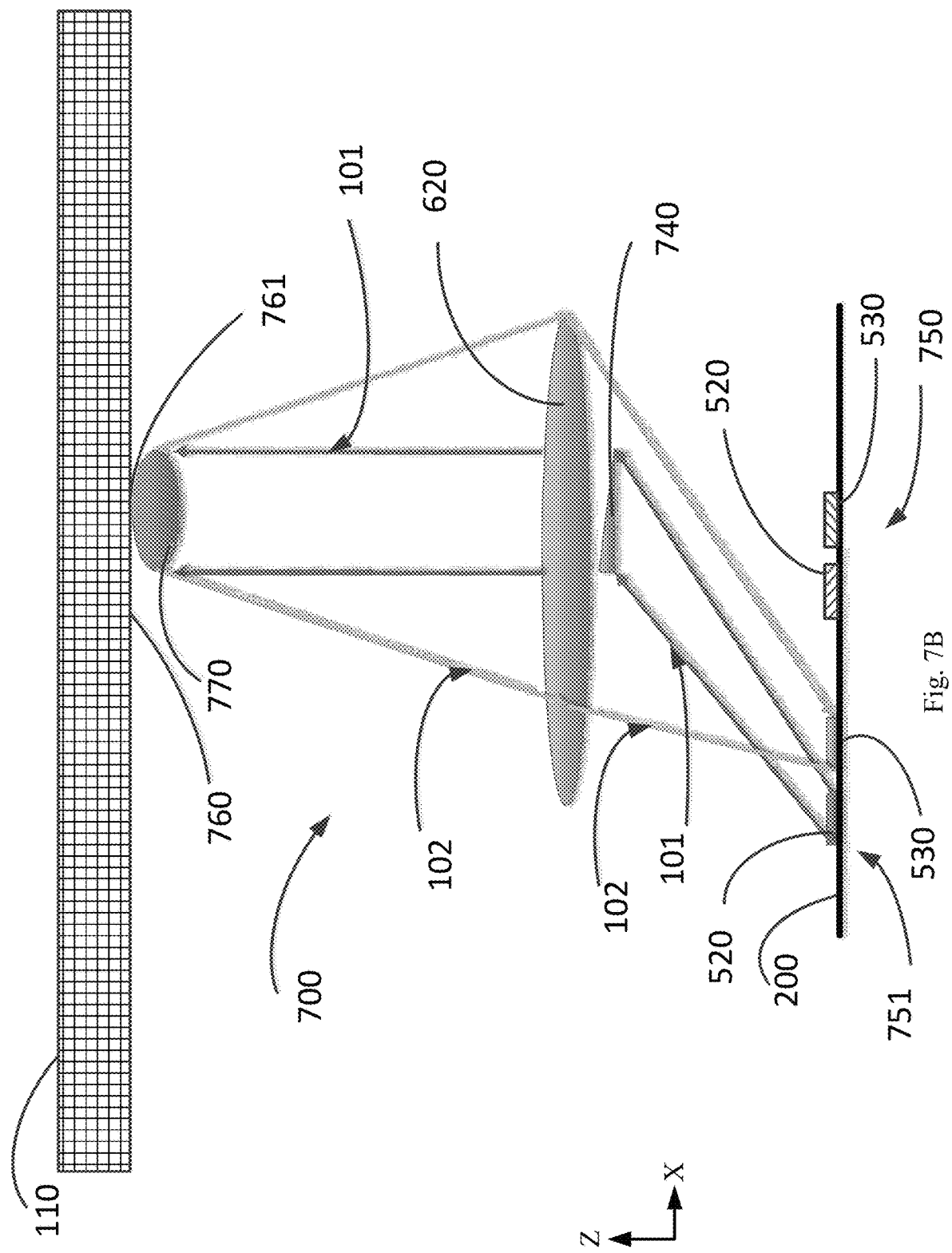

SYSTEMS AND METHODS FOR ISOLATING EXCITATION AND SIGNAL PATHS FOR CHIP-SCALE LIDAR

RELATED APPLICATIONS

The present application incorporates by reference each of the following applications:

U.S. provisional patent application No. 62/516,602, filed Jun. 7, 2017, titled "Integrated MEMS Switches for Selectively Coupling Light In and Out of a Waveguide" naming Steven J. Spector and Michael G. Moebius as inventors [practitioner's file 3898/1101];

U.S. patent application Ser. No. 15/844,527, filed Dec. 16, 2017, titled "Integrated MEMS Switches for Selectively Coupling Light In and Out of a Waveguide," naming Steven J. Spector, Michael G. Moebius, Benjamin F. Lane, and Gregg E. Favalora as inventors [practitioner's file 3898/1129];

U.S. provisional patent application No. 62/498,158, filed Dec. 16, 2016, titled "All-solid state optical transmit/receive terminal," [practitioner's file 3898/1083—inventors Benjamin F. Lane and Steven J. Spector];

U.S. provisional patent application No. 62/450,855, filed Jan. 26, 2017, titled "Method and Apparatus for Light Field Generation" [practitioner's file 3898/1075—inventors Gregg Ethan Favalora, Steven Jay Spector and Benjamin Fredrick Lane], and U.S. nonprovisional patent application Ser. No. 15/876,719, filed Jan. 22, 2018 [practitioner's file 3898/1122—inventors Gregg Ethan Favalora, Steven Jay Spector and Benjamin Fredrick Lane]; and The entire contents of each of the foregoing patent applications are hereby incorporated by reference, for all purposes.

TECHNICAL FIELD

The present invention relates to photonic integrated circuits, and more particularly to Light Detection and Ranging (LIDAR) transceivers.

BACKGROUND ART

Active sensing systems, e.g. LiDAR, which use the same path for excitation and detection have the drawback of additional loss and often require gating on the detector. Loss is incurred because a 3 dB splitter is required to separate the excitation path from the detector. This loss impacts the outgoing excitation pulse or beam, as well as the return signal. In optical systems with limited laser power and limited return signal, avoiding these losses can be desirable.

Additionally, back reflections after the 3 dB splitter can show up as noise on the detector, requiring that the detector be turned on a finite amount of time after the excitation pulse is sent out. In LiDAR systems, for example, this imposes a minimum distance at which objects can be detected, based on how long it takes to turn on the detector.

Such problems may be avoided by the use of separate modules (which are spatially separated) for excitation and detection, respectively. However, this introduces problems with parallax and undesirably increases the size of the device.

Such problems may also be avoided by the use of a circulator between the laser, chip, and detector which routes light from the laser, through the circulator, and onto the chip and return signal from the chip, through the circulator, and into the detector. However, circulators undesirably require bulky off-chip components, and prohibit implementation of a system on a single chip. Moreover, this undesirably adds to the size of a system, especially if multiple laser sources and detectors are required.

SUMMARY OF THE EMBODIMENTS

A first embodiment provides an integrated chip for transmitting a Light Detection and Ranging (LiDAR) signal into free space and receiving, as a return signal, a reflection of that transmitted LiDAR signal from free space. The integrate chip includes a substrate defining a surface, and a space vector normal to the surface. The substrate has an output waveguide configured to carry an excitation light signal from a light source.

The integrated circuit also has a return waveguide distinct from the output waveguide, which return waveguide is configured to carry the return signal to a detector.

The integrated circuit also has an optical coupler movable between a first position and a second position, whereby in the first position, the optical coupler is disposed to couple the excitation light signal from the output waveguide to the free space as the transmitted LiDAR signal, and to couple the return signal from the free space to the return waveguide; and whereby in the second position, the optical coupler is optically decoupled from the output waveguide and the return waveguide.

The integrated chip also includes an actuator configured to selectively move the optical coupler between the first position and the second position.

In some embodiments, the return waveguide forms a waveguide crossing with the output waveguide, but in other embodiments the return waveguide does not form a waveguide crossing with the output waveguide. In some embodiments, the output waveguide runs parallel to the return waveguide.

In some embodiments, the optical coupler includes an output grating coupler and an input grating coupler.

In yet other embodiments, the optical coupler includes a pillar grating, the pillar grating configured to couple the excitation signal from the output waveguide to the free space and to couple the return signal from the free space to the return waveguide.

In some embodiments, the actuator further includes a bridge waveguide in optical communication with the input grating coupler and the return waveguide to couple the return signal from the input grating coupler to the return waveguide.

Some embodiments include more than the one return waveguide. For example, some such embodiments also include, in addition to the first return waveguide mentioned above, a second return waveguide configured to carry a transverse electric wave (TE) component of the return signal to a TE detector. In such embodiments, in the first position, the optical coupler is disposed to couple a transverse magnetic wave (TM) component to the first return waveguide, and to couple the TE component to the second return waveguide.

Another embodiment is a Light Detection and Ranging ("LiDAR") system configured to transmit a transmitted optical signal, and to receive a reflection of the transmitted signal as a return signal. The system includes a photonic integrated circuit configured to transmit the transmitted optical signal. To that end, the photonic integrated circuit includes a TM detector, and a TM return waveguide configured to carry a TM-polarized component of the reflection to the TM detector.

The system also includes a lens system configured to separate a TM-polarized component from the reflection; and an optical coupler disposed to selectively couple the TM-polarized component to the TM return waveguide.

In some embodiments, the lens system includes a birefringent wedge.

In some embodiments, the photonic integrated circuit also includes a TE detector, and a TE return waveguide configured to carry a TE-polarized component of the reflection to the TE detector. In such embodiments, the lens system is further configured to separate the TE-polarized component from the reflection. For example, in some such embodiments, the lens system includes a Faraday isolator.

In some embodiments, the system also includes a lens having a focal point, and the lens is disposed such that the photonic integrated circuit is at the focal point of the lens. The system also includes a prism disposed between the lens and the photonic integrated circuit.

Yet another embodiment is an optical system configured to transmit a transmitted optical signal, and to receive a reflection of the transmitted signal as a return signal. In this embodiment, the system includes a photonic integrated circuit configured to transmit the transmitted optical signal, the photonic integrated circuit having a TM detector, and a TM return waveguide configured to carry a TM-polarized component of the reflection to the TM detector.

The system also includes optical means for separating a TM-polarized component from the reflection; and coupling means for selectively coupling the TM-polarized component to the TM return waveguide.

In some embodiments, the coupling means includes a pillar grating.

In some embodiments, the optical means for separating a TM-polarized component from the reflection includes a birefringent wedge, and in other embodiments the coupling means includes a Faraday isolator.

In some embodiments, the photonic integrated circuit further includes a TE detector, and a TE return waveguide configured to carry a TE-polarized component of the reflection to the TE detector, and the optical means is further configured to separate the TE-polarized component from the reflection. In some embodiments, the optical means for separating a TM-polarized component from the reflection includes a Faraday isolator.

BRIEF DESCRIPTION OF THE DRAWINGS

The foregoing features of embodiments will be more readily understood by reference to the following detailed description, taken with reference to the accompanying drawings, in which:

FIG. 2A and FIG. 2B schematically illustrate plan views of an embodiment of a photonic integrated circuit;

FIG. 2C schematically illustrates an isometric view of an embodiment of a photonic integrated circuit;

FIG. 3C and FIG. 3D schematically illustrate a MEMS actuator in the OFF position and the ON position, respectively, relative to an output waveguide carrying an excitation signal;

FIG. 3G and FIG. 3H schematically illustrate a MEMS actuator in the OFF position and the ON position, respectively, relative to an output waveguide and a return waveguide;

FIG. 5A and FIG. 5B schematically illustrate an embodiment of a pixel array;

FIG. 5C and FIG. 5D schematically illustrate another embodiment of a pixel array;

FIG. 5G and FIG. 5H schematically illustrate an embodiment of a pixel array;

FIG. 5I schematically illustrates an embodiment of a pixel;

FIG. 6A schematically illustrates an embodiment of a lens system;

FIG. 6B schematically illustrates another embodiment of a lens system;

FIG. 6C schematically illustrates an embodiment of a lens system;

FIG. 6D schematically illustrates another embodiment of a lens system;

FIG. 7B schematically illustrates another embodiment of a lens system.

DETAILED DESCRIPTION OF SPECIFIC EMBODIMENTS

Preferred embodiments improve the performance of active sensing systems, such as LiDAR systems, and enable detection of objects closer to the system's sensor. Illustrative embodiments spatially separate the excitation and return signal on a photonic integrated chip ("PIC") such that separate waveguides can be used for the excitation and return signals, enabling isolation of the system's detectors from the excitation source without the use of a splitter or circulator. For example, preferred embodiments avoid loss due to the use of splitters and the need for gating the detector, and are desirably compatible with chip-scale systems. Moreover, illustrative embodiments keep the excitation and detection paths on the same PIC (e.g., in an interleaved configuration), which helps keep the system more compact and avoids issues introduced by parallax. In other words, illustrative embodiments teach a photonic integrated circuit that has both optical transmission circuits and transmission waveguides and optical reception circuits and reception waveguides on a single integrated circuit.

Illustrative embodiments are disclosed herein primarily in the context of a PIC which includes actuators (e.g., MEMS-actuated grating couplers) for controlling input and output coupling of light from the chip. In preferred embodiments, the chip contains arrays of output coupling gratings situated on actuators, which bring the gratings in close proximity to waveguides carrying excitation signal from an input laser source. The chip is situated in the focal plane of a lens. Depending on which grating is turned "on," the lens directs the outgoing signal to a different point within the field of view of the device. Some concepts are relevant to other PICs (e.g., phased arrays).

Definitions. As used in this description and the accompanying claims, the following terms shall have the meanings indicated, unless the context otherwise requires:

A "set" includes one or more members.

A "waveguide crossing" is a term of art, and means a junction of at least two waveguides in which the waveguides occupy the same physical space. Some such waveguide crossings can be "low loss," meaning that light traveling in the X-direction through a crossing will couple minimally into the waveguide aligned along the Y-direction.

LiDAR System

Figure 1A:
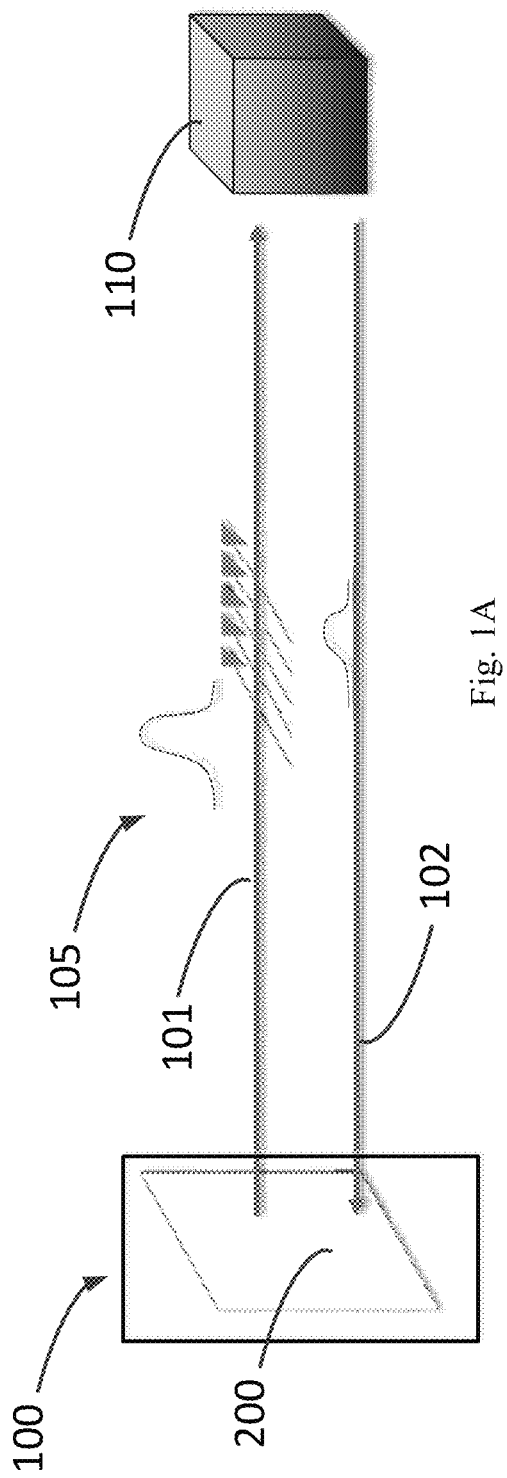
FIG. 1A schematically illustrates an embodiment of a LIDAR system.
Figure 1B:
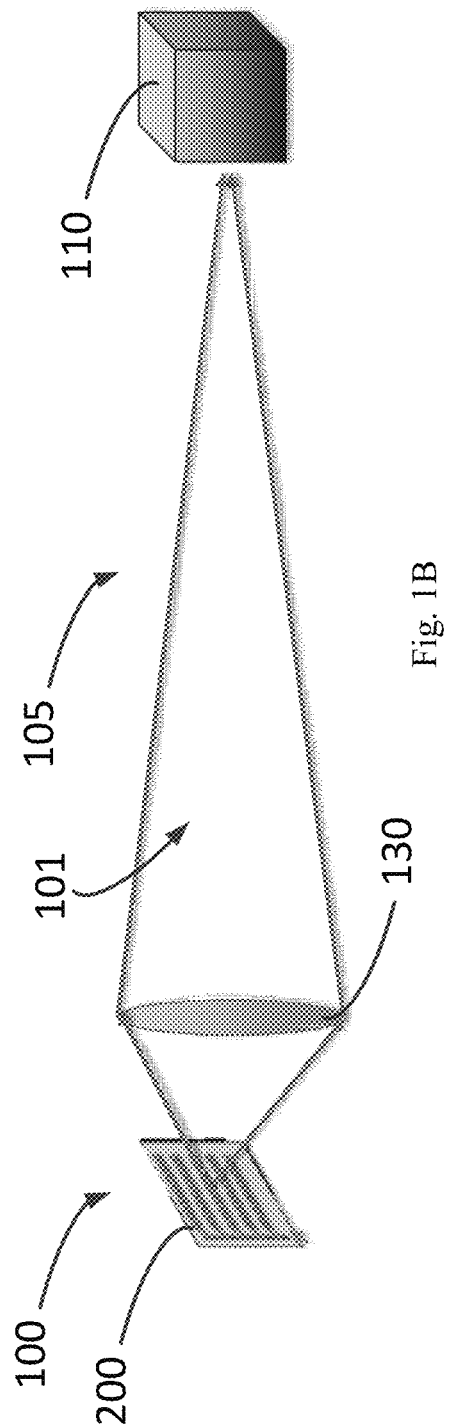
FIG. 1B schematically illustrates another embodiment of a LIDAR system.

FIG. 1A and FIG. 1B schematically illustrate embodiments of a LiDAR system 100. The LiDAR system 100 includes a LiDAR transmitter and receiver (or "transceiver"), which in FIG. 1A and FIG. 1B is a photonic integrated circuit 200 according to various embodiments described herein. The photonic integrated circuit 200 transmits an outgoing light pulse 101 into free space 105. The light pulse reflects off of object 110 to create a reflection, returns through free space 105 to the photonic integrated circuit 200 as return light pulse 102. It should be noted that FIG. 1A schematically illustrates both an outgoing light pulse 101 and a return light pulse 102, and that FIG. 1B schematically illustrates only the outgoing light pulse 101.

The LiDAR system 100 includes processing circuitry, such as processor circuit 250, shown in FIGS. 2A and 2B. LiDAR signal processing circuits are known in the art, and some features are described in more detail below. LiDAR signal processing circuits are configured to determine one or more characteristics of the object 100. The processor circuit 250 may be an application specific integrated circuit, or may be a programmable processor such as a digital signal processor, to name but a few examples. In some embodiments, the LiDAR system 100 may be configured to determine the distance between the LiDAR system 100 and the object 110, based on the time between its transmission of the output light pulse 101 and its receipt of the return light pulse 102. Such time may referred-to as the "time of flight." Moreover, in some embodiments, the LiDAR system 100 may be configured to determine, based on characteristic of the return light pulse (e.g., spectral and/or phase of the return light pulse 102) the speed and direction of the object 110 relative to the LiDAR system 100.

In some embodiments, the lens system 130 includes a lens 620, shown in FIGS. 6A and 6B and described in more detail below. The lens 620 has a focal plane, and photonic integrated circuit 200 is situated in the focal plane of a lens.

The lens system 130 is configured, in various embodiments, to perform one or more of the following actions: change the path of an outgoing light pulse 101 and/or of a return light pulse 102; focus an outgoing light pulse 101; focus an outgoing light pulse 101 and/or a return light pulse 102; separate, in space, polarized components of outgoing light pulse 101 and/or of a return light pulse 102 (e.g., separate TE-polarized components from TM-polarized components).

Photonic Integrated Circuit

FIG. 2A schematically illustrates an embodiment of a LiDAR photonic integrated circuit (PIC) 200 in which a return waveguide 530 delivers return signals to a common detector 220. FIG. 2B schematically illustrates an embodiment of a LiDAR photonic integrated circuit 200 in which a plurality of return waveguides 530 deliver return signals to a detector, or a corresponding plurality of detectors 220.

FIG. 2C schematically illustrates an embodiment of a surface 203 of a PIC 200 transmitting a light signal 101 to free space 105.

The PIC 200 includes an excitation source 210 configured to supply an excitation light signal onto an output waveguide 520. The excitation source 210 may be a laser or laser diode integrated onto the PIC 200, or may be an input configured to receive an excitation light signal from a source external to the PIC 200.

The output waveguide 520 carries the excitation signal to each pixel 231 in a pixel array 230. As described in various embodiments below, each pixel 231 is disposed at or adjacent to the output waveguide 520 and a return waveguide 530. In some embodiments, each pixel 231 is disposed at a waveguide junction 540 (shown in FIGS. 5A, 5B and 5D, and described in more detail below) formed by the output waveguide 520 and a return waveguide 530.

Each pixel 231 includes an actuator 300 (shown in FIGS. 3A and 3B and described in more detail below) configured to move an optical grating system 400 (shown in FIGS. 3A through 3D and 4C and described in more detail below) relative to the output waveguide 520 and return waveguide 530. Embodiments of actuators 300 and grating systems 400 are disclosed below.

In general, the optical grating system 400 is configured to perform two functions: a transmit function that couples an excitation signal from an output waveguide 520 to free space 105, and a receive function to couple a return signal from free space 105 to a return waveguide (530, 570). To that end, in some embodiments the optical grating system 400 may include a single grating that performs both the transmit function and the receive function. In some embodiments the optical grating system 400 includes two or more gratings, at least one of which couples the excitation signal from an output waveguide to free space 105, and at least another one of which couples a return signal from free space 105 to a return waveguide, such as return waveguide 530 described below, and/or return waveguide 570, shown in FIGS. 5J and 5K, also described below.

In preferred embodiments, the actuator 300 and optical grating system 400 act as a switch to turn the pixel 231 "ON" (to couple an excitation signal from the output waveguide 520 to free space 105, and to couple a return signal from free space 105 to the return waveguide) and "OFF" (to couple little, if any, of the excitation signal from the output waveguide 520 to free space 105, and little, if any, of the return signal from free space 105 to the return waveguide 530). Specification of how much coupling constitutes "ON" and "OFF" states will be determined by the requirements of the system employing the PIC 200, as would be understood by, and determinable by, a person having ordinary skill in the art.

As the optical grating system 400 moves closer to an output waveguide 520 in which is propagating an excitation signal, the optical grating system 400 couples quantitatively more of the excitation signal to free space 105. Ideally, in the "ON" state, the optical grating system 400 couples 100 percent of the excitation signal from the output waveguide 520 to free space and 100 percent of the return signal to the return waveguide 530. In practice, however, some coupling of less than 100 percent may be acceptable, depending on the specification and/or requirements of the system employing the PIC 200. For example, typical calculated values for coupling light out of a waveguide are between 40-80%, although higher percentages are possible, depending on grating design and system requirements. In illustrative embodiments, an "ON" state for output of the excitation signal may be specified as a state in which the percentage of excitation signal directed from the output waveguide 520 to free space 105 is at least 40%, or at least 50%, or at least 60%, or at least 70%, or at least 80%. In preferred embodiments, the percentage of excitation signal directed from the output waveguide 520 to free space 105 is at least 85%, at least 90%, at least 95%, at least 99%, or at least 99.9%, to name but a few examples.

Moreover, as the optical grating system 400 moves closer to a return waveguide 530, the optical grating system 400 couples quantitatively more of the return signal 102 from free space 105 to the return waveguide 530. In an "ON" state, the optical grating system 400 is considered to be optically coupled to the pixel 231. For example, typical calculated values for coupling light from free space 105 into a waveguide 530 are between 20-80%, depending on the polarization of the incident light, relative to the designed polarization of the grating and a number of other factors. In illustrative embodiments, an "ON" state for receiving the return signal 102 may be specified as a state in which the percentage of return signal 102 directed from free space 105 to the return waveguide 530 is at least 20%, and in illustrative embodiments is at least 30%, at least 40%, at least 50%, at least 60%, at least 70%, and at least 80%. In preferred embodiments, the percentage of return signal 102 directed from free space 105 to the return waveguide 530 is at least 85%, at least 90%, at least 95%, at least 99%, or at least 99.9%, to name but a few examples.

Conversely, when the actuator 300 moves, or has moved, the optical grating system 400 away from the output waveguide 520, the optical grating system 400 couples quantitatively less of the excitation signal to free space 105. Ideally, in an "OFF" state, the optical grating system 400 couples none (0.0%) of the excitation signal 102 from the output waveguide 520 to free space 105. In practice, however, in illustrative embodiments, an "OFF" state for output of the excitation signal may be specified as a state in which the percentage of excitation signal directed from the output waveguide 520 to free space 105 is less than 15%, or less than 10%, or less than 5%, to name but a few examples.

Similarly, when as the optical grating system 400 is away from the return waveguide 530, the optical grating system 400 couples quantitatively less of the return signal 102 from free space 105 to the return waveguide 530. Ideally, in an "OFF" state, the optical grating system 400 couples none (0.0%) of the return signal 102 from free space 105 to the return waveguide 530. In practice, however, in illustrative embodiments, an "OFF" state may be specified as a state in which the percentage return signal 102 directed from free space 105 to the return waveguide 530 is less than 15%, or less than 10%, or less than 5%, to name but a few examples. In some embodiments, in an "OFF" state, the optical grating system 400 couples less than 4% of the return signal 102 from free space 105 to the return waveguide 530, and in preferred embodiments, the optical grating system 400 couples less than 1% of the return signal 102 from free space 105 to the return waveguide 530, and in some embodiments, the optical grating system 400 couples less than 0.1% of the return signal 102 from free space 105 to the return waveguide 530. In preferred embodiments, the actuator 300 at each pixel 231 is independently and selectively controllable, such that each pixel 231 in a pixel array 230 may be selectively controlled, including being turned "ON" or "OFF," or a state between "ON" and "OFF." For example, in preferred embodiments, each pixel 231 in an array 230 is individually addressable and is controllable by controller 260. In illustrative embodiments, one or more groups of pixels 231, which groups may include a subset of two or more pixels 231 or the entire array 230, may be controlled (turned ON and OFF) simultaneously.

Actuator

Figure 3A:
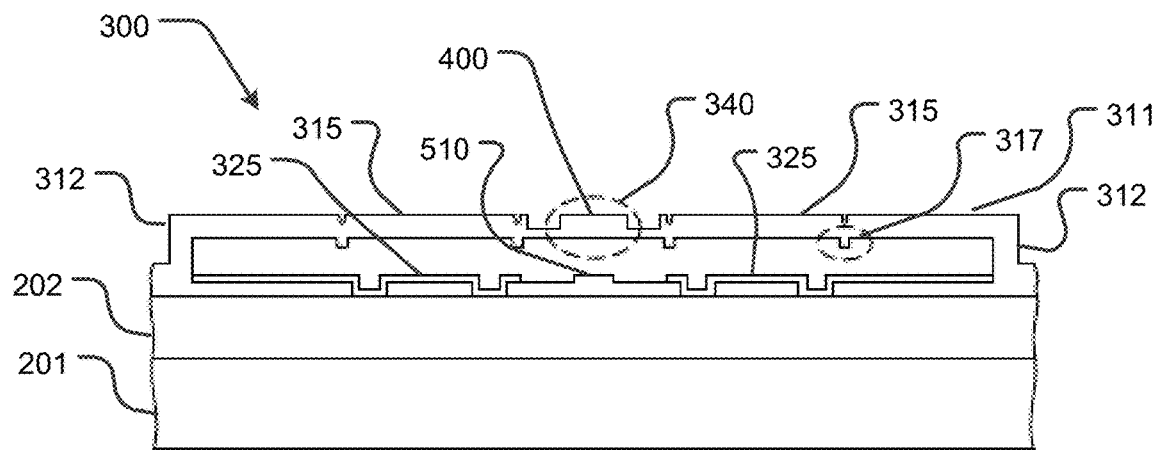
FIG. 3A and FIG. 3B schematically illustrate a Microelectromechanical Systems (MEMS) actuator in the OFF position and the ON position, respectively.
Figure 3B:
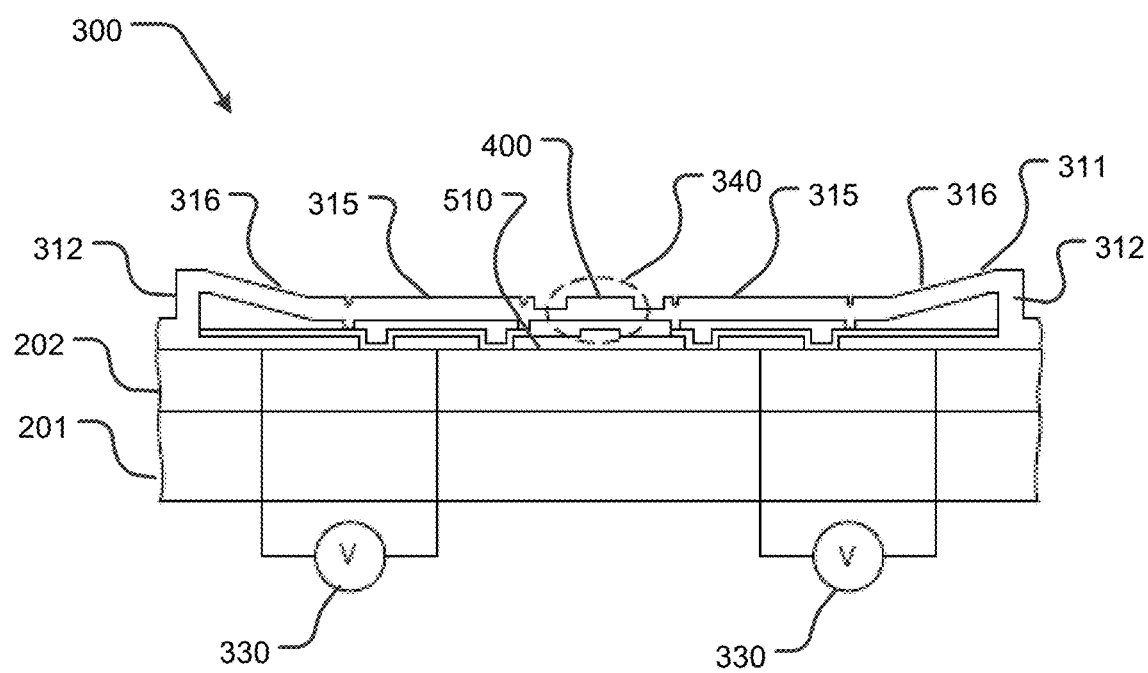

FIG. 3A and FIG. 3B schematically illustrated a MEMS actuator 300 that is configured to selectively translate an optical grating system 400 to an ON position (FIG. 3B) and to an OFF position (FIG. 3A).

In the ON position, the optical grating system 400 on the MEMS actuator 300 is optically coupled to the output waveguide 520 such that the optical grating system 400 couples an excitation signal from an output waveguide 520 to free space 105 as a transmitted signal 101, and couples a reflection (return pulse 102) of that transmitted signal 101 to a return waveguide (530, 570).

In the OFF position, the optical grating system 400 on the MEMS actuator 300 is optically decoupled from the output waveguide 520 and the return waveguide (530, 570).

FIG. 3A is a schematic side view of the MEMS actuator 300 in the OFF position, with the optical grating system 400 shown within a dashed ellipse 340, and FIG. 3B is a schematic side view of the MEMS actuator 300 in the ON position.

The optical grating system 400 is part of, or affixed to, a controllably moveable bridge 311. The bridge 311 is spaced apart from, and disposed above, a substrate 201. The substrate 201 may include a buried oxide layer 202. The bridge 311 is supported by piers 312. An embodiment of an optical waveguide 510 (e.g., an output waveguide 520, a return waveguide 530, or a waveguide junction 540) is disposed in or on the substrate 201 under the optical grating system 400.

The bridge 311 includes two first electrostatic actuation electrodes 315. Two corresponding second electrostatic actuation electrodes 325 are disposed on the substrate 201, such that the two first actuation electrodes 315 register over the two second actuation electrodes 325, respectively. The bridge 311 also includes two flexures 316.

Thus, an electric potential 330 applied across the first and second actuation electrodes 315 and 325, as shown schematically in FIG. 3B, causes an electrostatic force that urges the first actuation electrodes 315 and the optical grating system 400 toward the substrate 201, thereby bringing the optical grating system 400 within an appropriate distance of the optical waveguide 510. Absent such an electric potential and the resulting electrostatic force, the flexures 316 return the optical grating system 400 to the OFF position, as shown in FIG. 3A. A boss 317 (FIG. 3A) may be included to limit travel distance of the optical grating system 400 when the electric potential 330 is applied.

FIG. 3C is a schematic side view of the MEMS actuator 300 with optical grating system 400 in the OFF position, showing that the excitation signal 523 in the output waveguide 520 passes by the optical grating system 400 without coupling to free space 105. In the OFF position, the optical grating system 400 is disposed a distance 350 from the output waveguide 520 sufficient to optically decouple the optical grating system 400 from the output waveguide 520. An optical grating system 400 is deemed to decoupled from an output waveguide 520 if the optical coupling between the optical grating system 400 and the output waveguide 520 is below a threshold determined, by a designer of an optical system, to be sufficiently low for the system's specified needs. In some embodiments, the distance 350 is about 1 µm (1,000 nm). In some embodiments, the distance 350 may be about 800 nm. In some embodiments, the distance 350 may be about 250 nm. In the OFF position (FIG. 3C), most or substantially all excitation signal 523 (light) in the output waveguide 520 continues along the output waveguide 520, as indicated by an arrow.

FIG. 3D is a schematic side view of the MEMS actuator 300 with optical grating system 400 in the ON position, and showing that the excitation signal 523 in the output waveguide 520 couples to free space 105. In the ON position, the optical grating system 400 is disposed a distance 360 from the MEMS actuator 300 with optical grating system 400 sufficient to optically couple the output waveguide 520 with optical grating system 400 with a coupling efficiency as described above. In some embodiments, the distance 360 is about 10-50 nm. In the ON position, with a transverse electric wave (TE) grating coupler 420 much, most or substantially all light in the output waveguide 520 is emitted by the optical grating system 400 into free space 105, as indicated by an arrow 101.

Figure 3E:
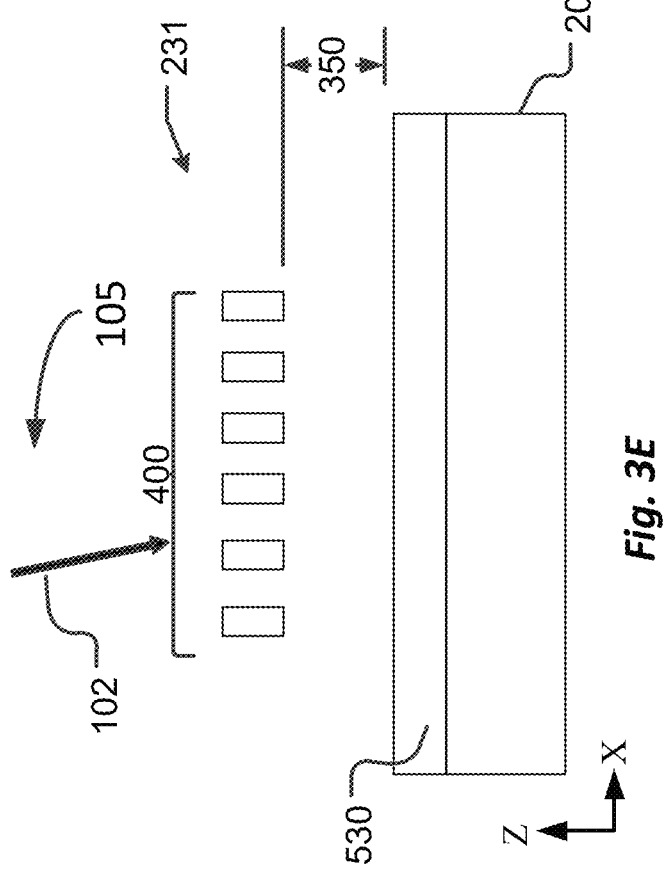
FIG. 3E and FIG. 3F schematically illustrate a MEMS actuator in the OFF position and the ON position, respectively, relative to a return waveguide.

FIG. 3E is a schematic side view of the MEMS actuator 300 with optical grating system 400 in the OFF position, showing that the return signal 102 impinging on the optical grating system 400 does not couple into the return waveguide 530.

Figure 3F:
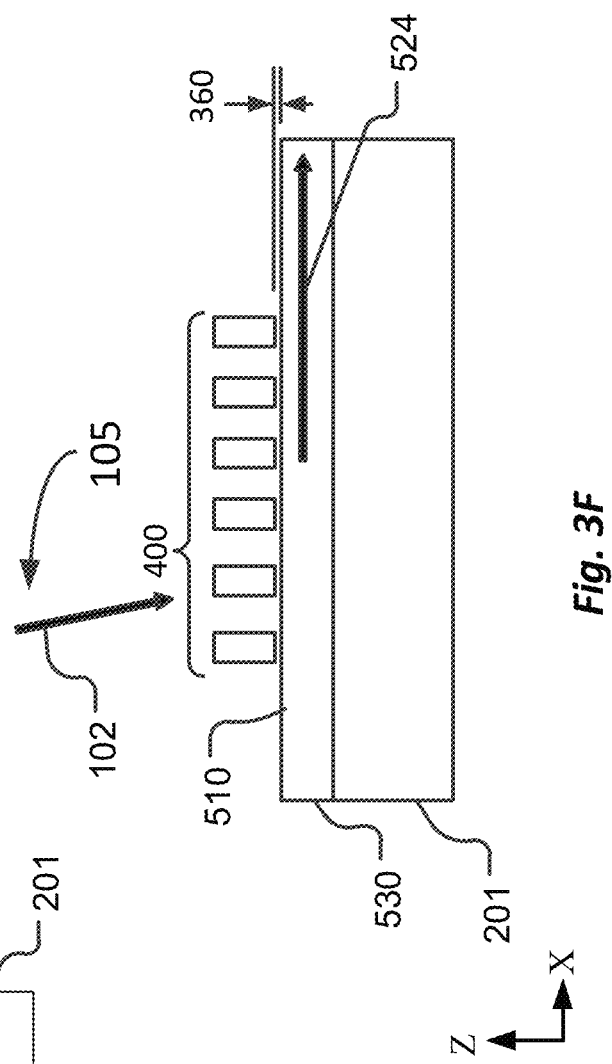

FIG. 3F is a schematic side view of the MEMS actuator 300 with optical grating system 400 in the ON position, showing that the return signal 102 impinging on the optical grating system 400 does couple into the return waveguide 530, as illustrated by signal 524.

FIG. 3G and FIG. 3H schematically illustrate another embodiment of a MEMS actuator 300 that is configured to selectively translate an optical grating system 400 to an ON position (FIG. 3H) and to an OFF position (FIG. 3G). This embodiment schematically illustrates two optical waveguides—an output waveguide 520 and a return waveguide 530—disposed in or on the substrate 201 under the optical grating system 400, but the present embodiment may also be used with a waveguide junction 540 as shown previously.

In this embodiment, the optical grating system 400 is part of, or affixed to, a controllably moveable arm 313. The arm 313 is supported above the substrate 201 by, and flexibly cantilevered from, a pier 312.

The arm 313 includes a first electrostatic actuation electrode 315, and a corresponding second electrostatic actuation electrode 325 is disposed on the substrate 201, such that the first actuation electrode 315 registers over the second actuation electrode 325. An electric potential 330 applied across the first and second actuation electrodes 315 and 325, as shown schematically in FIG. 3H, causes an electrostatic force that urges the first actuation electrode 315, the arm 313, and the optical grating system 400 toward the substrate 201, thereby bringing the optical grating system 400 within an appropriate distance of the output waveguide 520 and return 530. Absent such an electric potential and the resulting electrostatic force, the cantilevered arm 313 returns the optical grating system 400 to the OFF position, as shown in FIG. 3G.

Optical Grating Systems

Several embodiments of optical grating systems 400 are described below. Gratings configured to couple light into and out of waveguides interact with a portion of the mode profile of guided mode in the waveguide. This can be accomplished by partially or fully etching the waveguide to form the grating or by placing the grating on or in close proximity to the waveguide. Gratings in close proximity to, but not touching, the waveguide are capable of diffracting light because the grating interacts with the evanescent field of the guided mode. In this regard, gratings are distinguishable from mirrors, in that mirrors must physically intersect a light pulse in order to change its direction. Use of a mirror, therefore, necessarily requires a break or gap in a waveguide into which a mirror can move to intersect a light pulse propagating on the waveguide. Embodiments described herein do not require a grating to physically intersect a light pulse in order to change its direction, and therefore do not require a break or gap in a waveguide. One consequence of these embodiments is that an output waveguide 520 carrying an excitation light pulse, and/or a return waveguide 530, 570 receiving a return pulse 102, can be continuous (without break or gap) throughout its interaction with an optical grating system 400. Moreover, such continuity allows a light pulse traveling in an optical waveguide 510 to continue its travel along the optical waveguide 510, past any grating when the crating is in the OFF configuration.

Grating geometry determines grating performance and the impact it has on light that interacts with it. Grating periodicity is the characteristic that defines the angle of diffracted orders from the grating. This can be described through an analytical formula, commonly referred to as the grating equation [See Palmer, C., & Loewen, E. (2005). Diffraction Grating Handbook. Newport Corporation (6th ed.).]:

$$m\lambda = d(\sin(\alpha) + \sin(\beta))$$

where m is the diffraction order, which is an integer, d is the grating periodicity, $\alpha$ is the incidence angle of light on the grating relative to the grating normal, and $\beta$ is the exit angle of light from the grating relative to the grating normal. In the case of using a grating to steer light out of a waveguide, the wavelength is dependent on the effective index of the guided mode $\lambda = \lambda_0/n_{\textit{eff}}$ and the incidence angle on the grating $\alpha = 90°$. A grating will emit vertically out of the waveguide if the periodicity is equal to the wavelength of light in the grating.

In practice, it would be within the skill set of a person of ordinary skill in the art to use numerical modeling to drive the design process for gratings and to fine tune design parameters around the parameters predicted by analytical equations. Finite difference time domain solvers (e.g., Lumerical FDTD Solutions) can be used to calculate the electric field produced by a guided mode interacting with a grating in close proximity by solving Maxwell's equations in a mesh grid that takes into account the geometry of the system and the optical material properties of the waveguide, grating, substrate, and surrounding medium.

Pillar Gratings

Figure 4A:
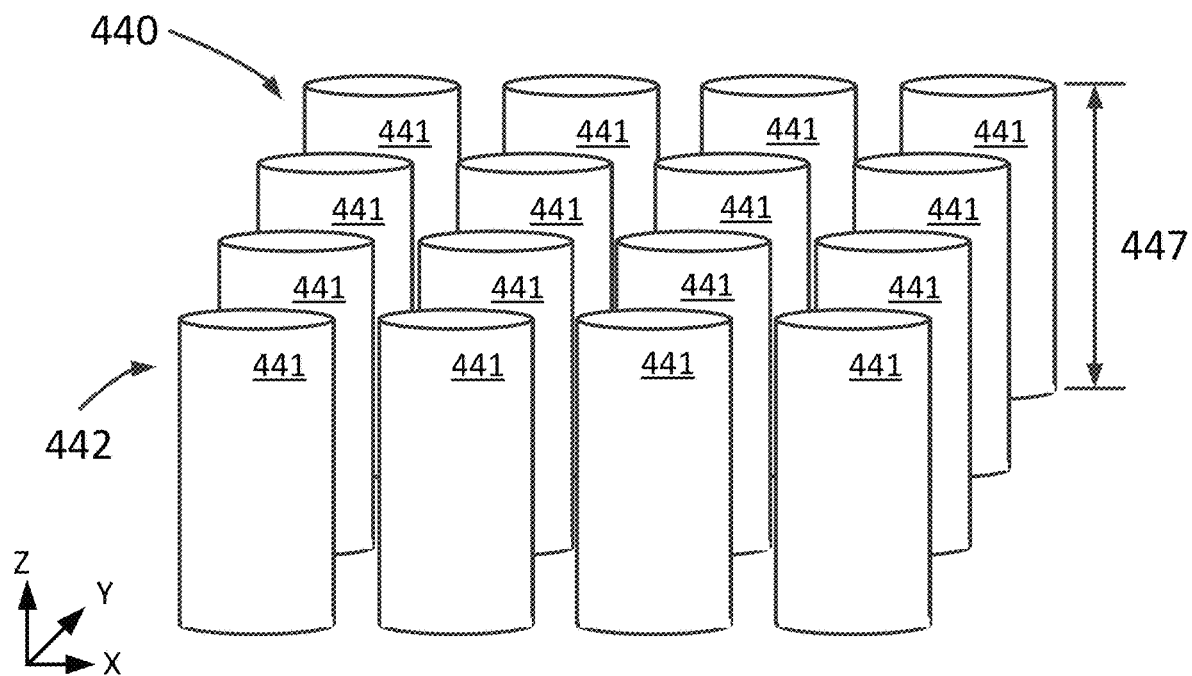
FIG. 4A and FIG. 4B schematically illustrate a pillar grating.
Figure 4B:
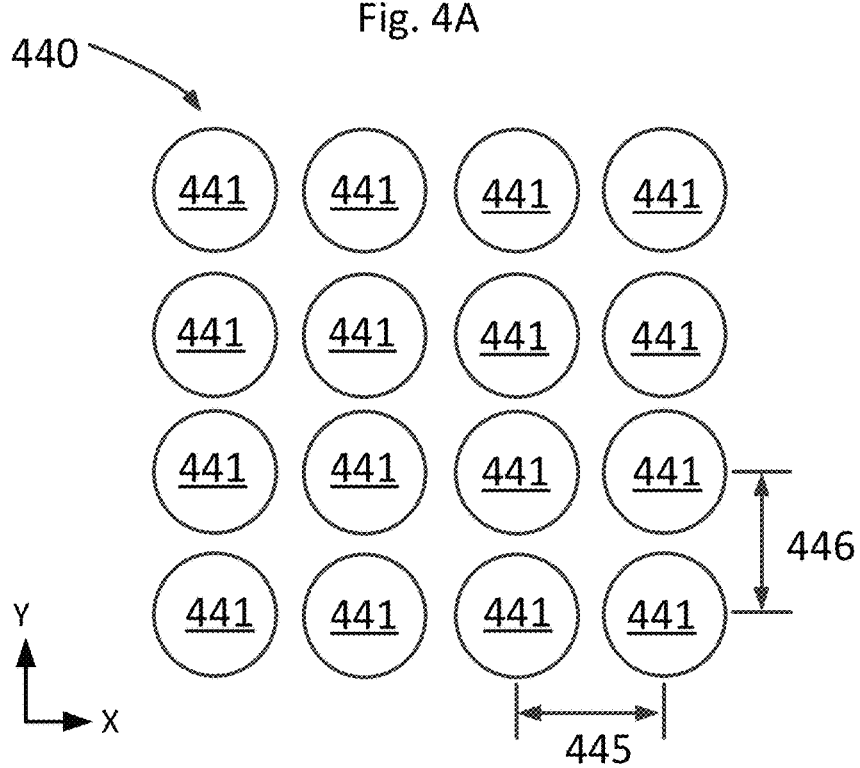

FIG. 4A and FIG. 4B schematically illustrate an embodiment of an optical grating system 400. In particular, the optical grating system 400 of FIG. 4A and FIG. 4B is a pillar grating 440, which may be described as a "2D" grating. The pillar grating 440 is configured to perform both the transmit and receive functions, in that it both couples TE waves from an output waveguide 520 to free space 105, and couples a reflection (return pulse 102) from free space 105 to a return waveguide 530.

The pillar grating 440 includes an array 442 having several pillars 441. In some embodiments, each pillar 441 may have a circular cross-section, and in other embodiments each pillar 441 has an ellipsoidal cross-section.

The pillars 441 have a height 447, and are arranged in a pattern with a uniform spacing 445 between columns and uniform spacing 446 between rows. The spacing of the columns and rows may be referred to as the "grating period" (or "periodicity") of the array 442. In other embodiments, the pillars 441 are arranged in a chirped pattern (varied periodicity along the length 445), or an apodized pattern (varying the fraction of the grating period that is air relative to material along the length).

Generally, the pillar grating 440 couples a TE-polarized light signal approaching the pillar grating 440 along the X-axis (FIG. 4A) to free space, in the Z-direction, and couples a TM-polarized reflection signal approaching the pillar grating 440 from the Z direction to a return waveguide 530 in the Y direction. More specifically, the pillar grating 440 redirects the propagation direction by some angle, theta, determined by the periodicity of the grating along the light's propagation direction within the optical waveguide 510. For example, if the grating periodicity equals the wavelength of light in the optical waveguide 510, the pillar grating 440 will emit in the +Z direction. If, however, the grating periodicity is longer or shorter than the wavelength of light, the grating will emit in the X-Z plane, at an angle off the Z-axis.

A person having ordinary skill in the art, and in possession of this disclosure would know how to arrange grating periodicity to achieve that person's design objectives.

Grooved Gratings

Figure 4C:
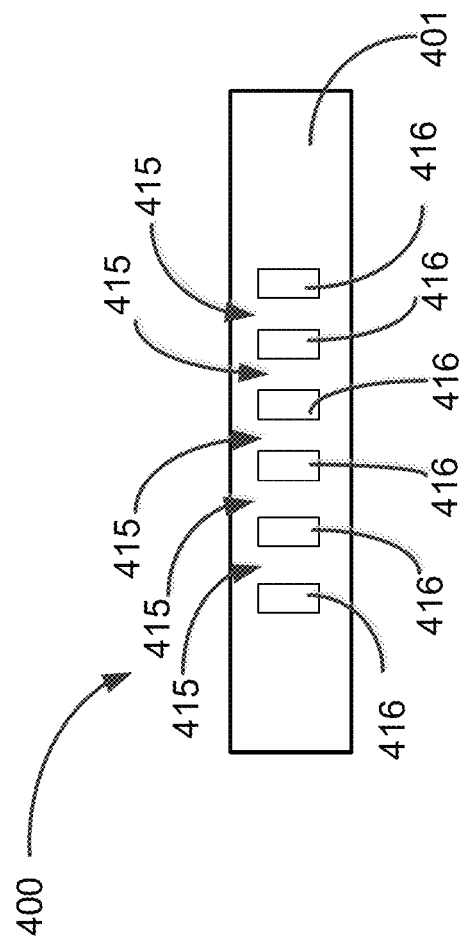
FIG. 4C schematically illustrates an embodiment of a grooved optical grating.

FIG. 4C is a schematic top view of an embodiment of an optical grating system 400 (which may be referred to as a "grooved optical grating") having a plurality of parallel or approximately parallel periodic grooves 415. An optical grating system 400 of this type is a spatially periodic structure that defines a plurality of regions having a first refractive index, interspersed with regions having a different second refractive index. The spatial period is selected based on the wavelength of interest. In some cases, periodic grooves are defined in a material. In other cases, two different materials, having different refractive indexes, are alternated. For simplicity of explanation, the term "groove" is used herein to represent an actual groove, i.e., void, or one of the two alternating materials of an optical grating.

The grooves 415 are separated by walls 416. The grooves 415 and walls 416 may be implemented by respective materials having different refractive indexes. The walls 416 may be made of silicon, silicon nitride or another suitable material using conventional semiconductor fabrication techniques. The grooves 415 may be voids or made of a suitable material different from the walls 416. Although the optical grating system 400 is shown with six walls 416, any suitable number of walls 416 and/or grooves 415 may be used.

In some embodiments, the optical grating system 400 with grooves 415 is disposed a distance (D) about 20 nm from the optical waveguide 510. The optical waveguide 510 is about 150 nm thick (T) silicon on an oxide substrate 401. The input light beam is a Gaussian with an about 2.5 μm radius. The optical grating system 400 with grooves 415 is about 50 nm thick (H). The optical grating system 400 has a groove period (A) of about 580 nm. Appropriate modifications may be made, such as changing the groove period (A) for other wavelengths of light, as would be known by one of ordinary skill in the art.

Pixel Arrays

FIG. 5A schematically illustrates a pixel array 230 having in incoming output waveguide 520 that diverges into several branches 521. Each branch 521 forms a plurality of waveguide crossings 540 with a corresponding plurality of return waveguides 530. An actuator 300 with a pillar grating 440 is disposed at each waveguide crossing 540 to form a pixel 231. One such waveguide crossing 540 is schematically illustrated in FIG. 5B.

When the actuator 300 and pillar grating 440 are in the OFF position, TE-polarized light traveling in the output waveguide 520 (or a branch 521 of the output waveguide 520) passes the pillar grating without coupling to free space 105, and TM-polarized light impinging on the pillar grating 440 from free space 105 does not couple to the return waveguide 530.

However, when the actuator 300 and pillar grating 440 are in the ON position, the pillar grating 440 couples TE-polarized light traveling in the output waveguide 520 (or a branch 521 of the output waveguide 520) to free space 105, and couples TM-polarized light impinging on the pillar grating 440 from free space to the return waveguide 530.

FIG. 5C and FIG. 5D schematically illustrate another embodiment of a pixel array 230 having an incoming output waveguide 520 that diverges into several branches 521. This embodiment includes several return waveguides 530 that run generally parallel to the output branches 521, and form a waveguide crossing 540 by a plurality of curved spurs 532. Each pixel 231 in FIG. 5C operates as described above for the pixels 231 in FIG. 5A.

In summary, each pixel 231 in FIG. 5A and in FIG. 5C includes a 2D coupler movable between a first position (ON) and a second position (OFF). In the embodiments of FIG. 5A, FIG. 5B, FIG. 5C and FIG. 5D, the pixel 231 can be selectively turned off and on by controlling the actuator 300 to move the pillar grating 440 between the OFF and ON positions.

Figure 5E:
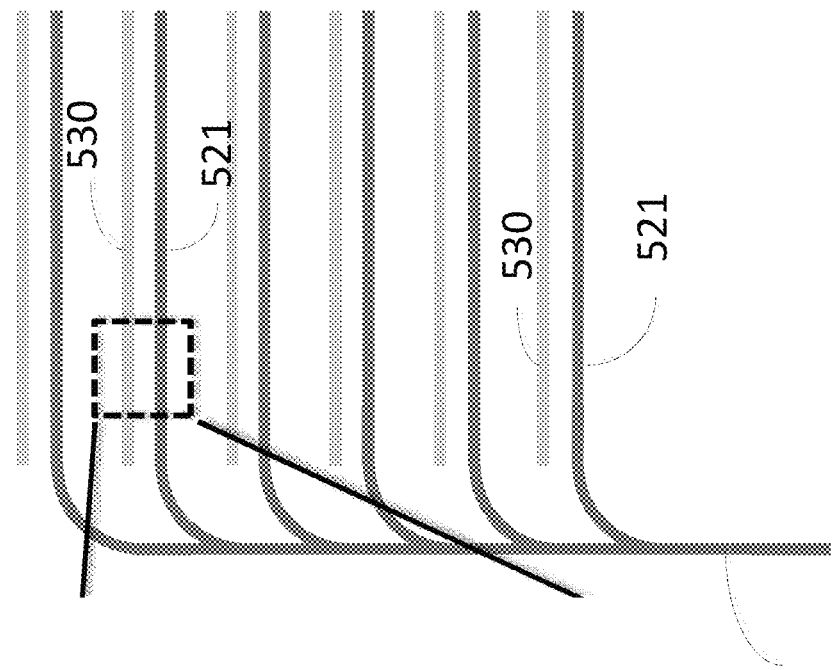
FIG. 5E and FIG. 5F schematically illustrate another embodiment of a pixel array.
Figure 5F:
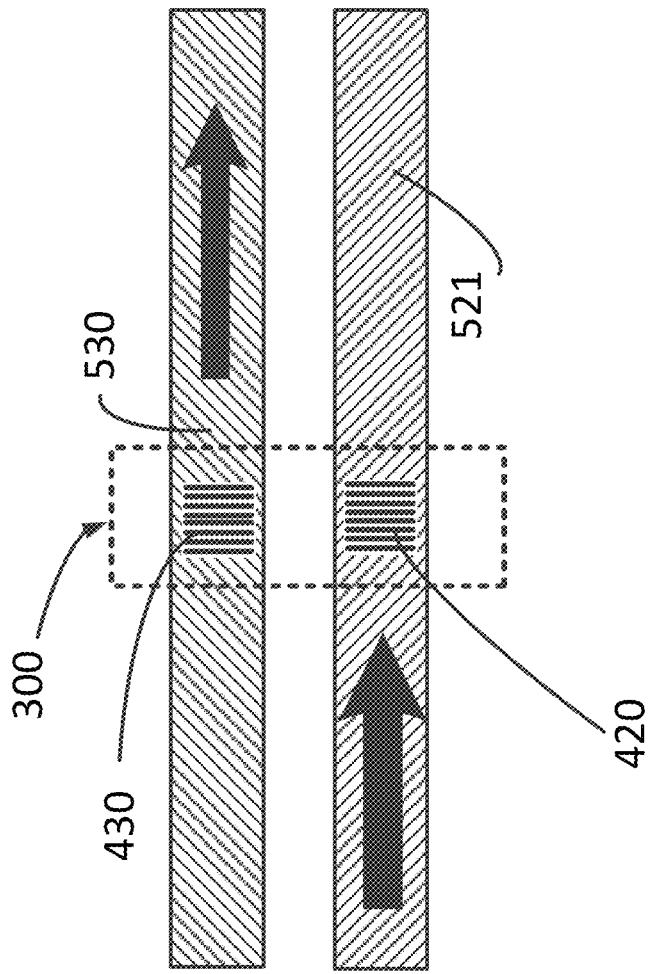

FIG. 5E and FIG. 5F schematically illustrate another embodiment of a pixel array 230 having an output waveguide 520 that diverges into several branches 521, and several return waveguides 530 that run generally parallel to the output branches 521, but the output waveguide 520 (and its branches 521) do not form any waveguide crossings with the return waveguides 530.

In this embodiment, the optical grating system 400 includes two grated optical couplers 420 and 430. In the ON position, grated optical coupler 420 couples TE-polarized light from the output waveguide branch 521 to free space 105, and the grated optical couples 430 couples impinging TM-polarized light to the return waveguide 530.

FIG. 5G and FIG. 5H schematically illustrate another embodiment of a pixel array 230. In this embodiment, the optical grating system 400 includes two grated optical couplers 420 and 430. In the ON position, grated optical coupler 420 couples TE-polarized light from the output waveguide branch 521 to free space 105, and the grated optical coupler 430 couples impinging TM-polarized light to a bridge 311 on the MEMS actuator 300. The bridge 311, in turn, couples the TM-polarized light to the return waveguide 530. In this embodiment, neither the return waveguide 530, nor the bridge 311, form a waveguide crossing with the output waveguide 520 or a branch 521 of the output waveguide 520.

FIG. 5I schematically illustrates another embodiment of a pixel 231 in a pixel array 230. In this embodiment, the optical grating system 400 includes two grated optical couplers 420 and 430. In the ON position, grated optical coupler 420 couples TE-polarized light from the output waveguide branch 521 to free space 105, and the grated optical couplers 430 couples impinging TM-polarized light to an intermediate waveguide 525 on the photonic integrated circuit 200. The intermediate waveguide 525, in turn, couples the TM-polarized light to the return waveguide 530. In this embodiment, neither the return waveguide 530, nor the intermediate waveguide 525, form a waveguide crossing with the output waveguide 520 or a branch 521 of the output waveguide 520. Also, the intermediate waveguide 525 is not on the actuator 300, but instead crosses over the output waveguide 520 (such that the output waveguide 520 is between the substrate 201 and the intermediate waveguide 525).

Figure 5J:
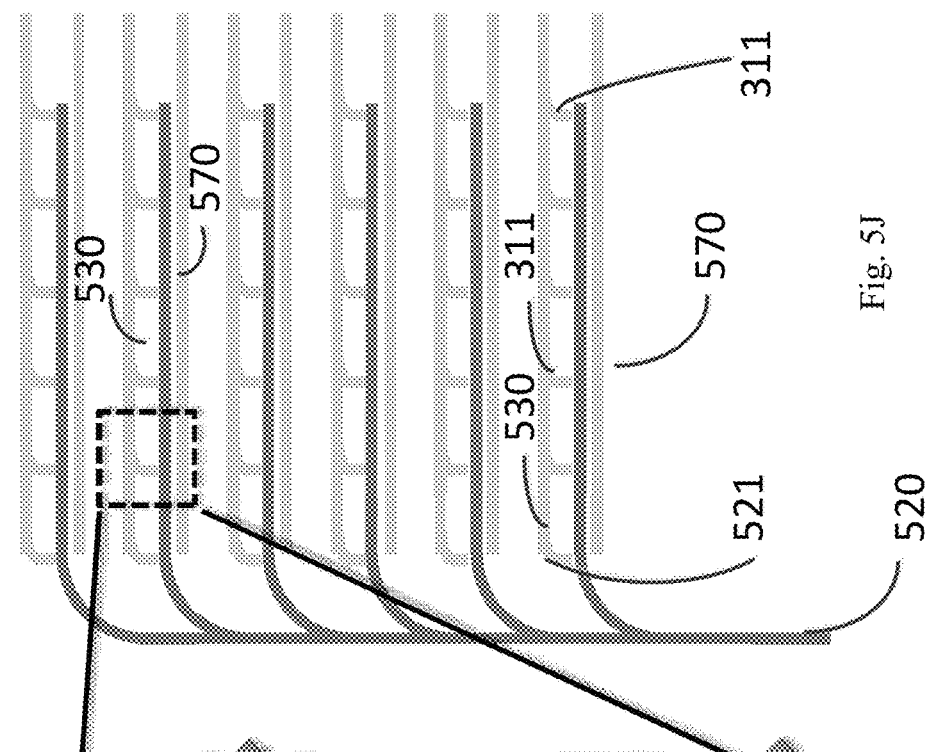
FIG. 5J and FIG. 5K schematically illustrate an embodiment of a pixel array.
Figure 5K:
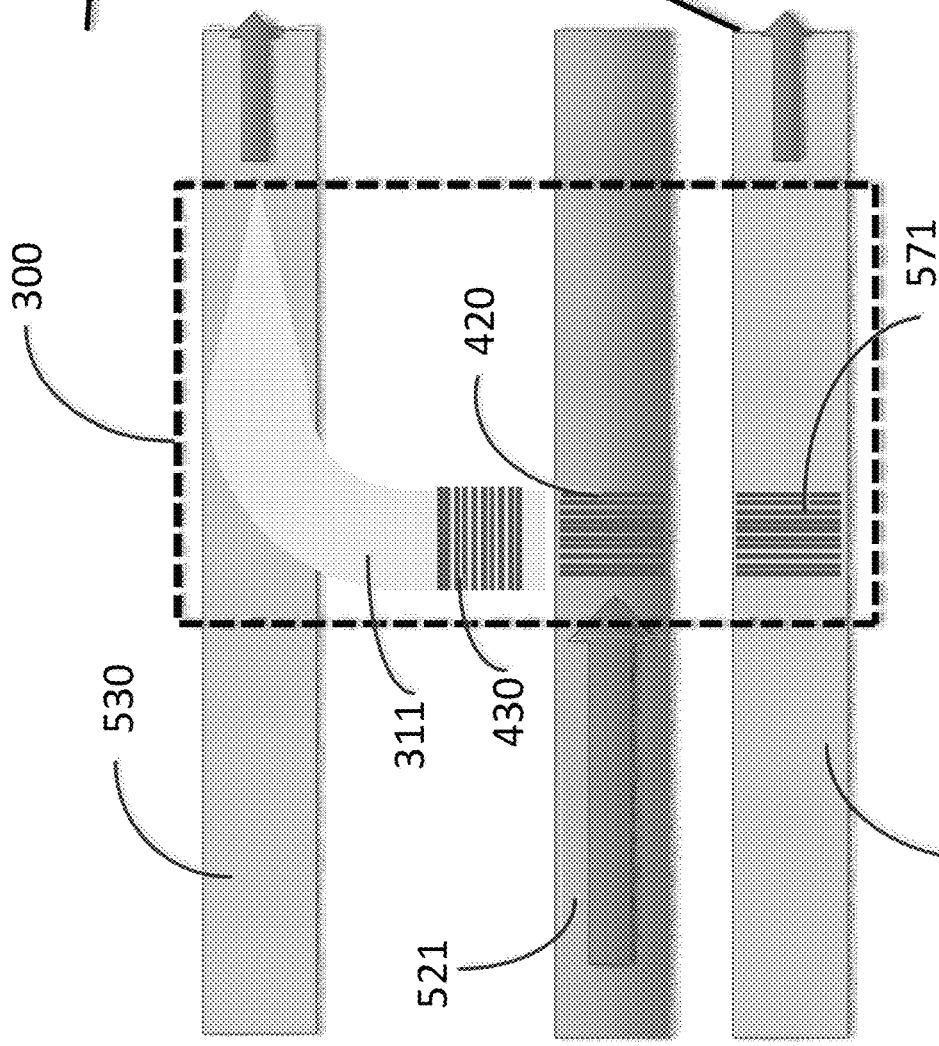

FIG. 5J and FIG. 5K schematically illustrate an embodiment of a pixel array 230 that is configured to receive both the return TE-component 103 and the return TM-component 104, as shown in FIG. 6B and described in more detail below. The pixel array 230 of FIGS. 5J and 5K is similar to the embodiments of FIGS. 5A-5I, but includes a TE return waveguide 570 and a TE-return-grating coupler 571. The TE-return-grating coupler 571 couples the return TE-component 103 to the TE return waveguide 570, and the TE return waveguide 570 carries the return TE-component 103 to a detector 220.

FIG. 6A and FIG. 6B schematically illustrates an embodiment of a lens system 130 configured to separate components of a return light pulse 102 into components having different polarizations. For example, the embodiments of FIG. 6A and FIG. 6B may be configured to separate components of a return light pulse 102 into a first component having TE polarization (a "TE component") and a second component having a TM polarization (a "TM component"). The embodiments of FIG. 6A and FIG. 6B may be used in conjunction with any of the embodiments of FIGS. 5A-5I.

The lens system 130 of FIGS. 6A and 6B includes, in the path of outgoing light pulse 101, a birefringent wedge 610 and a lens 620. The outgoing light pulse 101 is TE polarized and passes through the birefringent wedge 610 without change, as shown in FIG. 6A.

The return light pulse 102 also passes through the lens 620, and then through the birefringent wedge 610, as shown in FIG. 6B. The birefringent wedge 610 acts as a phase separator 600 that separates the return light pulse 102 into a return TE-component 103 and a return TM-component 104.

In a LiDAR system 100, the photonic integrated circuit 200 is disposed such that the return TM-component 104 impinges on a pixel 231, and in particular on an optical grating system 400. The optical grating system 400 couples the return TM-component 104 to a return waveguide 530, and the return waveguide 530 carries the return TM-component 104 to a detector 220.

FIG. 6C and FIG. 6D schematically illustrate another embodiment of a lens system 130. The embodiments of FIG. 6C and FIG. 6D may be used in conjunction with any of the embodiments of FIGS. 5A-5I.

The lens system 130 of FIGS. 6C and 6D includes, in the path of outgoing light beam 101, a polarization independent Faraday isolator 630 having a posterior (or first) birefringent wedge 610, a Faraday rotator 640, an anterior (or second) birefringent wedge 610, and a lens 620.

The outgoing light pulse 101 is TE polarized and is refracted by the posterior birefringent wedge 610 so that its path is laterally displaced. The outgoing light pulse 101 then passes through the Faraday rotator 640, the anterior birefringent wedge 610, and a lens 620 largely in a straight line.

The Faraday isolator 630 acts as a phase separator 600 for the return light pulse 102. The return light pulse 102 also passes through the lens 620, and then through the anterior birefringent wedge 610. The anterior birefringent wedge 610 separates the return light pulse 102 into two components: a return TE-component 103 and return TM-component 104 spatially separated by a gap 650.

The return TE-component 103 and return TM-component 104 next pass through the Faraday rotator 640 and through the posterior birefringent wedge 610. The posterior birefringent wedge 610 further spatially separates the return TE-component 103 and return TM-component 104 to a wider gap 651.

In a LiDAR system 100, the photonic integrated circuit 200 is disposed such that the return TM-component 104 impinges on a pixel 231, and in particular on an optical grating system 400. The optical grating system 400 couples the return TM-component 104 to a return waveguide 530, and the return waveguide 530 carries the return TM-component 104 to a detector 220.

Alternatively, in another embodiment, the photonic integrated circuit 200 is disposed such that the return TE-component 103 impinges on a pixel 231, and in particular on an optical grating system 400 that couples the return TE-component 103 to a return waveguide 530, and the return waveguide 530 carries the return TE-component 103 to a detector 220.

Figure 7A:
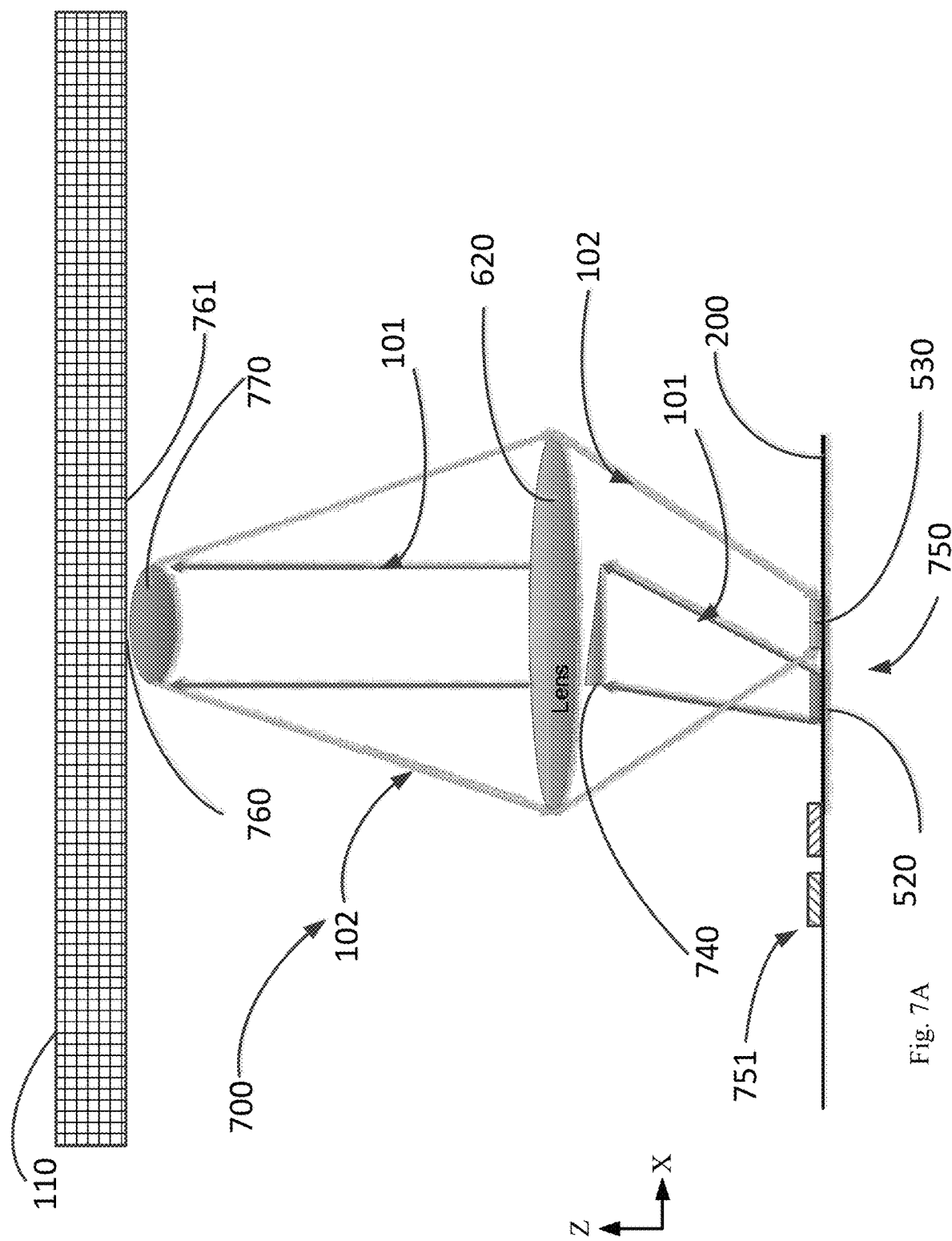
FIG. 7A schematically illustrates an embodiment of a lens system.

FIG. 7A and FIG. 7B schematically illustrate another embodiment of a lens system 700, which may be referred-to as a "reduced pupil" configuration. Although FIG. 7A and FIG. 7B do not show an actuator 300 or optical grating system 400, FIG. 7A and FIG. 7B may include any of the embodiments of actuator 300 and optical grating system 400 disclosed herein.

The embodiment of FIG. 7A and FIG. 7B schematically illustrates two pixels 750 and 751 disposed laterally from one another on a photonic integrated circuit 200. The pixels 750 and 751 may be any of the pixels 231 described above.

The lens system 700 includes a prism 740 disposed between the photonic integrated circuit 200 and lens 620. The prism 740 is substantially smaller than the lens 620, and is closer to the lens 620 than to the photonic integrated circuit 200, such that, from the point of view of a pixel 231 on the photonic integrated circuit 200, most, and in some embodiments substantially all, of the lens 620 would be visible and not blocked by the prism 740. In other words, if the pixel 231 defines the center of a sphere, the prism 740 occupies a substantially smaller solid angle than does the lens 620.

FIG. 7A schematically illustrates the operation of the lens system 700 when pixel 750 is ON. The outgoing light pulse 101 leaving the output waveguide 520 passes through the prism 740, which refracts the outgoing light pulse 101 towards the lens 620. The outgoing light pulse 101 then passes through the lens 620, and illuminates an illuminated spot 770 at location 760 on an object 110. The object 110 reflects some or all of the outgoing light pulse 101 to create the return light pulse 102.

The return light pulse 102 then passes back through the lens 620. The return light pulse 102 may be wider than the outgoing light pulse 101, and may pass through a greater portion of the lens 620. The lens 620 focuses the return light pulse 102 onto the return waveguide 530 in any of the embodiments described above in FIGS. 5A-5I, and/or to return waveguide 530 and/or TE return waveguide 570 in the embodiment of FIGS. 5J and 5K. Some of the return light pulse 102 impinges on the prism 740 and is lost or redirected, but because the prism 740 is smaller than the lens 620, and disposed close to the lens 620, most of the return light pulse 102 passes around the prism 740 and reaches the return waveguide 530 and/or TE return waveguide 570. The lens system 700 may be employed with any of the pixels 231 disclosed above, and with any of the lens systems disclosed in FIG. 6A. FIG. 6B, FIG. 6C and FIG. 6D.

FIG. 7B schematically illustrates the operation of the lens system 700 when pixel 751 is ON. As with FIG. 7A, the outgoing light pulse 101 leaving the output waveguide 520 passes through the prism 740, which refracts the outgoing light pulse 101 towards the lens 620. The outgoing light pulse 101 then passes through the lens 620, and illuminates an illuminated spot 770 on the object 110. In FIG. 7B, however, because the pixel 751 is laterally offset from pixel 750, the location 761 of the illuminated spot 770 on the object 110 is laterally offset from the location 760 of the illuminate spot 770 produced in FIG. 7A. In other words, the location on the object 110 of the illuminated spot 770 depends on which pixel, 750 or 751, is ON.

The return light pulse 102 then passes back through the lens 620. The return light pulse 102 may be wider than the outgoing light pulse 101, and may pass through a greater portion of the lens 620. The lens 620 focuses the return light pulse 102 onto the return waveguide 530 in any of the embodiments described above in FIGS. 5A-5I, and/or to return waveguide 530 and/or TE return waveguide 570 in the embodiment of FIGS. 5J and 5K. Some of the return light pulse 102 impinges on the prism 740 and is lost or redirected, but because the prism 740 is smaller than the lens 620, and disposed close to the lens 620, most of the return light pulse 102 passes around the prism 740 and reaches the return waveguide 530 and/or TE return waveguide 570. The lens system 700 may be employed with any of the pixels 231 disclosed above, and with any of the lens systems disclosed in FIG. 6A. FIG. 6B, FIG. 6C and FIG. 6D.

In this way, an object 110, or at least a plurality of points on an object 110, can be controllably and selectively illuminated by controlling which pixel 231 is ON. One consequence of the foregoing is that an object 110 can be scanned at a plurality if points (e.g., 760, 761) individually, or sequentially or in any order, electronically, and without physically moving parts.

Alternate Embodiments

Various embodiments have been described above using TE-polarized light at the excitation signal 523 and transmitted signal 101 via a TE-grating optical coupler 420, and TM-polarized light as the return signal 102 via a TM-grating optical coupler 430. However, other embodiments transmit TE-polarized light 101 from a TE-polarized excitation signal 523, and receive TE-polarized light as a return signal 102. In such embodiments, the optical coupler 430 is a TE-grating.

Other embodiments transmit TM-polarized light 101 from a TM-polarized excitation signal 523, and receive TE-polarized light as a return signal 102. In such embodiments, optical coupler 420 is a TM-grating and optical coupler 430 is a TE-grating.

Yet other embodiments transmit TM-polarized light 101 from a TM-polarized excitation signal 523, and receive TM-polarized light as a return signal 102. In such embodiments, optical coupler 420 is a TM-grating and optical coupler 430 is a TM-grating.

The following is a listing of some reference numbers used herein:
- 100: LiDAR system;
- 101: Outgoing light pulse;
- 102: Return light pulse;
- 103: Return TE-component;
- 104: Return TM-component;
- 105: Free space;
- 110: Object;
- 130: Lens system;
- 200: Photonic Integrated Circuit ("PIC");
- 201: Substrate;
- 202: Buried oxide layer;
- 203: Surface of PIC;
- 210: Light source;
- 220: Detector;
- 230: Pixel array;
- 231: Pixel;
- 250: Processing circuit;
- 260: Controller;
- 300: MEMS actuator;
- 310: Electrostatic MEMS structure;
- 311: Bridge;
- 312: Pier;
- 313: Arm;
- 315: Actuation electrode;
- 316: Flexure;
- 317: Boss;
- 325: Actuation electrode;
- 330: Actuation voltage;
- 350: Off gap;
- 360: On gap;
- 400: Optical grating;
- 401: Grating substrate;
- 415: Groove;
- 416: Wall
- 420: Transmit grating optical coupler (e.g., TE-grating; TM-grating);
- 430: Receive grating optical coupler (e.g., TE-grating; TM-grating);
- 440: Pillar grating;
- 441: Pillar;
- 442: Array of pillars;
- 445: X pitch;
- 446: Y pitch;
- 447: Height;
- 510: Waveguide;
- 520: Output waveguide;
- 521: Branch of output waveguide;
- 523: Light in output waveguide (excitation signal);
- 524: Light in return waveguide;
- 525: Intermediate waveguide;
- 530: Return waveguide;
- 531: Branch of return waveguide;
- 532: Waveguide spur;
- 540: Waveguide junction;
- 570: TE-return waveguide;
- 571: TE-return-grating coupler;
- 600: Phase separator;
- 610: Birefringent wedge;
- 620: Lens;
- 630: Faraday isolator;
- 640: Faraday rotator;
- 650: Gap between return components;
- 651: Second gap between return components;
- 740: Prism;
- 750: Pixel one;
- 751: Pixel two;
- 760: Location of illumination produced by pixel one;
- 761: Location of illumination produced by pixel two;
- 770: Illuminated spot.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision not to present these potential claims in later proceedings should not be construed as a donation of the subject matter to the public.

Without limitation, potential subject matter that may be claimed (prefaced with the letter "P" so as to avoid confusion with the actual claims presented below) includes:

P1. An integrated chip for transmitting a LiDAR signal into free space and receiving a reflection of a transmitted LiDAR signal from free space, comprising: a substrate defining a plane and a space vector normal to the plane, the substrate comprising: an output waveguide configured to carry an output light signal from a light source; a return waveguide configured to carry a return signal to a detector, the return waveguide forming a waveguide crossing with the output waveguide; and a 2D coupler (e.g., pillar array) movable between a first position and a second position, the 2D coupler configured, in the first position, to selectively couple the output light signal at the waveguide crossing from the output waveguide to the free space as a transmitted signal, and to selectively couple a reflection of the transmitted signal at the waveguide crossing from the free space to the return waveguide.

P2. The integrated chip of P1, wherein the 2D coupler is a pillar grating.

P3. The integrated chip of P1, wherein: the output waveguide has a first direction and the output light signal travels along the waveguide in the first direction; the return waveguide has a second direction that is different than the first direction; the 2D coupler is configured to redirect the output light signal from the first direction to the free space along the space vector; and the 2D coupler is configured to redirect the reflection of the transmitted signal from the free space to the second direction.

P4. The integrated chip of P1, wherein the first direction, second direction, and the vector are mutually orthogonal to one another.

P5. The integrated chip of P1 further comprising a MEMS actuator coupled to the 2D coupler and configured to controllably move the 2D coupler from the first position to the second position.

P6. The integrated chip of P1 wherein the output light signal has a TE polarization and the reflection has TM polarization.

The embodiments of the invention described above are intended to be merely exemplary; numerous variations and modifications will be apparent to those skilled in the art. All such variations and modifications are intended to be within the scope of the present invention as defined in the appended claims.

What is claimed is:

1. An integrated chip for transmitting a Light Detection and Ranging (LiDAR) signal into free space and receiving a reflection of the transmitted LiDAR signal from free space as a return signal, comprising:
   a substrate defining a surface, and a space vector normal to the surface, the substrate having:
   an output waveguide configured to carry an excitation light signal from a light source for a given pixel;
   a return waveguide, distinct and isolated from the output waveguide, configured to carry the return signal for the given pixel to a detector; and
   an optical coupler movable between a first position and a second position, wherein:
   in the first position, the optical coupler is disposed to couple the excitation light signal from the output waveguide to the free space as the transmitted LiDAR signal, and to couple the return signal from the free space to the return waveguide; and
   in the second position, the optical coupler is optically decoupled from the output waveguide and the return waveguide.

2. The integrated chip of claim 1, wherein the return waveguide forms a waveguide crossing with the output waveguide.

3. The integrated chip of claim 1, wherein the optical coupler comprises an output grating coupler and an input grating coupler.

4. The integrated chip of claim 1, wherein the return waveguide does not form a waveguide crossing with the output waveguide.

5. The integrated chip of claim 4, wherein the output waveguide runs parallel to the return waveguide.

6. The integrated chip of claim 1, wherein:
   the optical coupler comprises a pillar grating, the pillar grating configured to couple the excitation signal from the output waveguide to the free space and to couple the return signal from the free space to the return waveguide; and
   the integrated chip further comprises an actuator configured to selectively move the optical coupler between the first position and the second position.

7. The integrated chip of claim 1, wherein:
   the optical coupler comprises an output grating coupler and an input grating coupler; and
   the integrated chip further comprises an actuator configured to selectively move the optical coupler between the first position and the second position.

8. The integrated chip of claim 7, wherein the actuator further comprises a bridge waveguide in optical communication with the input grating coupler and the return waveguide to couple the return signal from the input grating coupler to the return waveguide.

9. The integrated chip of claim 1, wherein:
   the return waveguide is a first return waveguide and is configured to carry a TM component of the return signal to a TM detector; and
   the integrated chip further comprises a second return waveguide configured to carry a TE component of the return signal to a TE detector, wherein:
   in the first position, the optical coupler is disposed to couple the TM component to the first return waveguide, and to couple the TE component to the second return waveguide.

10. An integrated chip for transmitting a Light Detection and Ranging (LiDAR) signal into free space and receiving a reflection of the transmitted LiDAR signal from free space as a return signal, comprising:
    a substrate defining a surface, and a space vector normal to the surface, the substrate having:
    an output waveguide configured to carry an excitation light signal from a light source;
    a return waveguide, distinct and isolated from the output waveguide, configured to carry the return signal to a detector; and
    an optical coupler movable between a first position and a second position, wherein:
    in the first position, the optical coupler is disposed to couple the excitation light signal from the output waveguide to the free space as the transmitted LiDAR signal, and to couple the return signal from the free space to the return waveguide; and in the second position, the optical coupler is optically decoupled from the output waveguide and the return waveguide, wherein more than a terminal portion of the output waveguide and more than a terminal portion of the return waveguide are disposed in or on the substrate.

11. The integrated chip of claim 10, wherein all portions of the output waveguide and all portions of the return waveguide are disposed in or on the substrate.

12. An integrated chip for transmitting a Light Detection and Ranging (LiDAR) signal into free space and receiving a reflection of the transmitted LiDAR signal from free space as a return signal, comprising:

a substrate defining a surface, and a space vector normal to the surface, the substrate having:

an output waveguide configured to carry an excitation light signal from a light source;

a return waveguide, distinct and isolated from the output waveguide, configured to carry the return signal to a detector; and an optical coupler movable between a first position and a second position, wherein:

in the first position, the optical coupler is disposed to couple the excitation light signal from the output waveguide to the free space as the transmitted LiDAR signal, and to couple the return signal from the free space to the return waveguide; and in the second position, the optical coupler is optically decoupled from the output waveguide and the return waveguide, wherein the output waveguide is configured to carry the excitation light signal transmitted into free space and not the return signal received from free space, and the return waveguide is configured to carry the return signal received from free space and not the excitation light signal transmitted into free space.

* * * * *